US010467842B2

(12) United States Patent
Kurian et al.

(10) Patent No.: US 10,467,842 B2
(45) Date of Patent: Nov. 5, 2019

(54) PORTABLE ITEM TRANSFER CONTAINER

(71) Applicant: Bank of America Corporation, Charlotte, NC (US)

(72) Inventors: Manu Jacob Kurian, Dallas, TX (US); Joseph Benjamin Castinado, North Glenn, CO (US)

(73) Assignee: Bank of America Corporation, Charlotte, NC (US)

( * ) Notice: Subject to any disclaimer, the term of this patent is extended or adjusted under 35 U.S.C. 154(b) by 210 days.

(21) Appl. No.: 15/462,058

(22) Filed: Mar. 17, 2017

(65) Prior Publication Data
US 2018/0268637 A1    Sep. 20, 2018

(51) Int. Cl.
| | | |
|---|---|---|
| G07D 11/00 | (2019.01) |
| G06F 21/31 | (2013.01) |
| G06K 9/00 | (2006.01) |
| G07D 11/125 | (2019.01) |
| G07D 11/20 | (2019.01) |
| G07D 11/28 | (2019.01) |

(52) U.S. Cl.
CPC .......... *G07D 11/125* (2019.01); *G06F 21/31* (2013.01); *G07D 11/20* (2019.01); *G07D 11/28* (2019.01)

(58) Field of Classification Search
CPC ...... G07D 11/125; G07D 11/20; G07D 11/28; G06F 21/31
USPC ................................. 700/231–244
See application file for complete search history.

(56) References Cited

U.S. PATENT DOCUMENTS

| | | |
|---|---|---|
| 4,087,568 A | 5/1978 | Fay et al. |
| 5,021,765 A | 6/1991 | Morgan et al. |
| 5,053,607 A | 10/1991 | Carlson et al. |
| 5,626,822 A | 5/1997 | Kadowaki et al. |
| 5,719,383 A | 2/1998 | Forrest et al. |
| 5,903,881 A | 5/1999 | Schrader et al. |
| 5,910,851 A | 6/1999 | Flaherty |
| 5,991,410 A | 11/1999 | Herb et al. |

(Continued)

OTHER PUBLICATIONS

Anonymous, "Advanced GeoServer Security With GeoFence", Jan. 4, 2014, pp. 1-7, https://www.slideshare.net/geosolutions/advanced-geoserver-security-with-geofence (Year: 2014).

(Continued)

*Primary Examiner* — Michael Collins
(74) *Attorney, Agent, or Firm* — Michael A. Springs; Moore & Van Allen PLLC; Peter B. Stewart

(57) ABSTRACT

A portable item transfer container typically includes an item storage unit and an item transfer unit configured to (i) dispense items stored in the item storage unit and (ii) receive items and store the items in the item storage unit. The container also typically includes a memory, a processor, and an item transfer application stored in the memory. The item transfer application is typically configured to: receive an activity request from a user, wherein the activity request includes (i) a request to withdraw items or (ii) a request to store items; authenticate an identity of the user; determine that the location of the container is within an authorized region of the user; and in response to authenticating the identity of the user and determining that the location of the portable item transfer container is within the authorized region of the user, process the activity request.

19 Claims, 11 Drawing Sheets

(56) References Cited

U.S. PATENT DOCUMENTS

| | | |
|---|---|---|
| 6,052,527 A | 4/2000 | Delcourt et al. |
| 6,142,284 A | 11/2000 | Saltsov |
| 6,229,317 B1 | 5/2001 | Barchuk |
| 6,272,674 B1 | 8/2001 | Holiday, Jr. |
| 6,341,373 B1 | 1/2002 | Shaw |
| 6,362,836 B1 | 3/2002 | Shaw et al. |
| 6,381,631 B1 | 4/2002 | van Hoff |
| 6,604,680 B2 | 8/2003 | Hamaguchi |
| 6,738,783 B2 | 5/2004 | Melli et al. |
| 6,966,485 B2 | 11/2005 | Lute, Jr. et al. |
| 6,983,836 B2 | 1/2006 | Adams et al. |
| 7,025,256 B1 | 4/2006 | Drummond et al. |
| 7,197,570 B2 | 3/2007 | Eylon et al. |
| 7,213,208 B2 | 5/2007 | Reichel et al. |
| 7,230,223 B2 | 6/2007 | Jespersen et al. |
| 7,478,381 B2 | 1/2009 | Roberts et al. |
| 7,721,868 B2 | 5/2010 | Wilfer |
| 8,060,400 B2 | 11/2011 | Wellman |
| 8,157,078 B1 | 4/2012 | Folk et al. |
| 8,181,854 B1 | 5/2012 | Folk et al. |
| 8,224,518 B2 | 7/2012 | Cameron |
| 8,301,564 B2 | 10/2012 | Mon et al. |
| 8,650,123 B2 | 2/2014 | Summerrow et al. |
| 8,943,598 B1 | 1/2015 | Kurian |
| 9,011,240 B2 | 4/2015 | Froy, Jr. et al. |
| 9,116,768 B1 | 8/2015 | Sawhney et al. |
| 9,123,200 B2 | 9/2015 | Froy, Jr. et al. |
| 9,129,489 B2 | 9/2015 | Froy, Jr. et al. |
| 9,152,933 B2 | 10/2015 | Wellman |
| 9,159,189 B2 | 10/2015 | Froy, Jr. et al. |
| 9,202,186 B2 | 12/2015 | Wellman et al. |
| 9,208,641 B2 | 12/2015 | Froy, Jr. et al. |
| 9,213,974 B2 | 12/2015 | Votaw et al. |
| 9,219,611 B1 | 12/2015 | Naik |
| 9,224,141 B1 | 12/2015 | Lamba et al. |
| 9,235,832 B1 | 1/2016 | Billman |
| 9,269,222 B2 | 2/2016 | Froy, Jr. et al. |
| 9,280,867 B2 | 3/2016 | Froy et al. |
| 9,280,868 B2 | 3/2016 | Froy et al. |
| 9,295,908 B2 | 3/2016 | Froy et al. |
| 9,355,218 B2 * | 5/2016 | Brown .................. A61J 7/0084 |
| 9,380,421 B1 | 6/2016 | Vltavsky |
| 9,384,477 B2 | 7/2016 | Johnson et al. |
| 9,395,132 B2 | 7/2016 | Stewart et al. |
| 9,400,150 B2 | 7/2016 | Stewart et al. |
| 9,404,698 B2 | 8/2016 | Stewart et al. |
| 9,460,428 B2 | 10/2016 | Johnson et al. |
| 9,466,053 B2 | 10/2016 | Johnson et al. |
| 9,471,908 B2 | 10/2016 | Johnson et al. |
| 9,471,909 B2 | 10/2016 | Johnson et al. |
| 9,477,953 B2 | 10/2016 | Johnson et al. |
| 9,519,921 B2 | 12/2016 | Wei et al. |
| 9,536,378 B2 | 1/2017 | Gadher et al. |
| 9,558,619 B2 | 1/2017 | Froy et al. |
| 9,558,620 B2 | 1/2017 | Froy et al. |
| 9,558,625 B2 | 1/2017 | Gadher et al. |
| 9,569,920 B2 | 2/2017 | Froy et al. |
| 2001/0014881 A1 | 8/2001 | Drummond et al. |
| 2002/0100660 A1 | 8/2002 | Stieber et al. |
| 2003/0220994 A1 | 11/2003 | Zhu |
| 2004/0016796 A1 | 1/2004 | Hanna et al. |
| 2004/0033832 A1 | 2/2004 | Solomon |
| 2004/0148254 A1 | 7/2004 | Hauser |
| 2004/0220859 A1 | 11/2004 | McGunn et al. |
| 2004/0231956 A1 | 11/2004 | Adams et al. |
| 2004/0267666 A1 | 12/2004 | Minami et al. |
| 2005/0121513 A1 | 6/2005 | Drummond et al. |
| 2005/0187826 A1 | 8/2005 | Wike et al. |
| 2005/0246357 A1 | 11/2005 | Geary et al. |
| 2006/0043167 A1 | 3/2006 | Fujioka |
| 2006/0089893 A1 | 4/2006 | Joseph et al. |
| 2006/0196926 A1 | 9/2006 | Benson et al. |
| 2006/0212372 A1 | 9/2006 | Eberhard et al. |
| 2006/0293783 A1 | 12/2006 | Hand et al. |
| 2007/0100750 A1 | 5/2007 | Hartfield et al. |
| 2007/0181676 A1 | 8/2007 | Mateen et al. |
| 2007/0185615 A1 * | 8/2007 | Bossi .................. G06F 19/3462 700/244 |
| 2007/0187485 A1 | 8/2007 | Aas et al. |
| 2007/0235520 A1 | 10/2007 | Smith et al. |
| 2007/0235521 A1 | 10/2007 | Mateen et al. |
| 2007/0235522 A1 | 10/2007 | Mateen et al. |
| 2007/0235523 A1 | 10/2007 | Clements |
| 2007/0246525 A1 | 10/2007 | Smith et al. |
| 2008/0005039 A1 | 1/2008 | Puthupparambil et al. |
| 2008/0040179 A1 | 2/2008 | Masermann et al. |
| 2008/0154691 A1 | 6/2008 | Wellman et al. |
| 2008/0154712 A1 | 6/2008 | Wellman |
| 2008/0237335 A1 | 10/2008 | Sawa |
| 2009/0108016 A1 * | 4/2009 | Brown .................. A61J 7/0084 221/28 |
| 2009/0326991 A1 | 12/2009 | Wei et al. |
| 2010/0006644 A1 | 1/2010 | Shepley et al. |
| 2010/0039247 A1 | 2/2010 | Ziegler et al. |
| 2010/0039319 A1 | 2/2010 | Cameron |
| 2010/0042940 A1 | 2/2010 | Monday et al. |
| 2010/0044332 A1 | 2/2010 | Cameron |
| 2010/0059419 A1 | 3/2010 | Kayani |
| 2010/0063624 A1 * | 3/2010 | Hyland .................. G06Q 10/10 700/237 |
| 2010/0131407 A1 | 5/2010 | Folk et al. |
| 2011/0184865 A1 | 7/2011 | Mon et al. |
| 2011/0270618 A1 | 11/2011 | Banerjee et al. |
| 2012/0046809 A1 | 2/2012 | Wellman |
| 2012/0046981 A1 | 2/2012 | Wellman |
| 2012/0046982 A1 | 2/2012 | Wellman |
| 2012/0130534 A1 * | 5/2012 | Wurm .................. G06Q 20/203 700/236 |
| 2012/0172027 A1 | 7/2012 | Partheesh et al. |
| 2012/0284183 A1 | 11/2012 | Summerrow et al. |
| 2012/0323687 A1 | 12/2012 | Schuster et al. |
| 2013/0091452 A1 | 4/2013 | Sorden et al. |
| 2013/0178233 A1 | 7/2013 | McCoy et al. |
| 2013/0267324 A1 | 10/2013 | Froy, Jr. et al. |
| 2013/0267325 A1 | 10/2013 | Froy, Jr. et al. |
| 2013/0267326 A1 | 10/2013 | Froy, Jr. et al. |
| 2013/0267327 A1 | 10/2013 | Froy, Jr. et al. |
| 2013/0273996 A1 | 10/2013 | Froy, Jr. et al. |
| 2013/0273998 A1 | 10/2013 | Froy, Jr. et al. |
| 2013/0303274 A1 | 11/2013 | Gadher et al. |
| 2013/0310156 A1 | 11/2013 | Gadher et al. |
| 2013/0310159 A1 | 11/2013 | Froy et al. |
| 2013/0310160 A1 | 11/2013 | Froy et al. |
| 2013/0311372 A1 | 11/2013 | Ramaci |
| 2013/0337895 A1 | 12/2013 | Froy et al. |
| 2014/0032345 A1 | 1/2014 | Moore |
| 2014/0038706 A1 | 2/2014 | Froy et al. |
| 2014/0046802 A1 | 2/2014 | Hosein et al. |
| 2014/0066179 A1 | 3/2014 | Froy et al. |
| 2014/0107836 A1 * | 4/2014 | Crews .................. G07F 19/206 700/236 |
| 2014/0213350 A1 | 7/2014 | Froy et al. |
| 2014/0290109 A1 | 10/2014 | Stewart et al. |
| 2014/0290110 A1 | 10/2014 | Stewart et al. |
| 2014/0324593 A1 | 10/2014 | Schuster et al. |
| 2014/0337219 A1 | 11/2014 | Ramaci |
| 2014/0360073 A1 | 12/2014 | Stewart et al. |
| 2015/0032638 A1 | 1/2015 | Dintenfass et al. |
| 2015/0227726 A1 | 8/2015 | Grigg et al. |
| 2015/0227927 A1 | 8/2015 | Votaw et al. |
| 2015/0294296 A1 | 10/2015 | Koeppel et al. |
| 2015/0302411 A1 | 10/2015 | Bondesen et al. |
| 2016/0019640 A1 | 1/2016 | Barnett et al. |
| 2016/0019641 A1 | 1/2016 | Barnett et al. |
| 2016/0041559 A1 | 2/2016 | Wellman et al. |
| 2016/0048834 A1 | 2/2016 | Kurian |
| 2016/0148179 A1 | 5/2016 | James et al. |
| 2016/0148463 A1 | 5/2016 | Gadher et al. |
| 2016/0180721 A1 | 6/2016 | Otulic |
| 2016/0298920 A1 | 10/2016 | Stewart et al. |
| 2016/0305727 A1 | 10/2016 | Stewart et al. |
| 2016/0305728 A1 | 10/2016 | Stewart et al. |

(56) References Cited

U.S. PATENT DOCUMENTS

2016/0345132 A1 11/2016 Creighton et al.
2016/0358432 A1 12/2016 Branscomb et al.

OTHER PUBLICATIONS

Ben Dickson, "5 Authentication Methods Putting Passwords to Shame", Mar. 31, 2016, pp. 1-29, https://thenextweb.com/insider/2016/03/31/5-technologies-will-flip-world-authentication-head/ (Year: 2016).
Tim Baker et al., "Up to What Distance Can Near Field Communication (NFC) Operate?", May 4, 2011, pp. 1-4, https://www.quora.conn/Up-to-what-distance-can-near-field-communication-NFC-operate (Year: 2011).
Webopedia, "Near Field Communication", Nov. 4, 2006, pp. 1-2, https://web.archive.org/web/20061104051205/https://www.webopedia.com/TERM/N/Near_Field_Communication.html (Year: 2006).
Margaret Rouse, "Geofencing", Jul. 3, 2012, pp. 1-13, https://web.archive.org/web/20120703191837/https://whatis.techtarget.conn/definition/geofencing (Year: 2012).
Robert Abel, "Major Banks to Roll Out ATMs That Use Smartphones for Authentication", Feb. 2, 2016, pp. 1-5, https://www.scmagazine.com/atms-will-authenticate-transactions-via-smart-phone/article/528443/ (Year: 2016).
Simon Puleo, "Geo-Fencing: Securing Authentication?", Oct. 3, 2016, pp. 1-27, https://blog.microfocus.com/geo-fencing-securing-authentication-2/ (Year: 2016).
Qualcomm Innovation Center, "Multifactor Authentication Based on User Contectual Data and the Mobile Web", Sep. 11, 2014, pp. 1-11, https://www.w3.org/2012/webcrypto/webcrypto-next-workshop/slides/newfeatures/mandyam-webcrypto2014_submission_29_presentation.pdf (Year: 2014).
Lee Munson, "MasterCard aims to reduce card fraud with smartphone geo-location technology", Feb. 26, 2014, pp. 1-14, https://nakedsecurity.sophos.com/2014/02/26/mastercard-aims-to-reduce-card-fraud-with-smartphone-geo-location-technology/ (Year: 2014).
Jim Bowen, How ATMs Work, Sep. 20, 2008, pp. 1-2, https://web.archive.org/web/20080920011931/https://money.howstuffworks.com/personal-finance/banking/atm2.htm (Year: 2008).
Christopher Beam, "The Mile High Club: How Ariel Refueling Works", Mar. 11, 2009, pp. 1-4, https://slate.com/news-and-politics/2009/03/how-does-aeriel-refuelinwork.html (Year:2009).

* cited by examiner

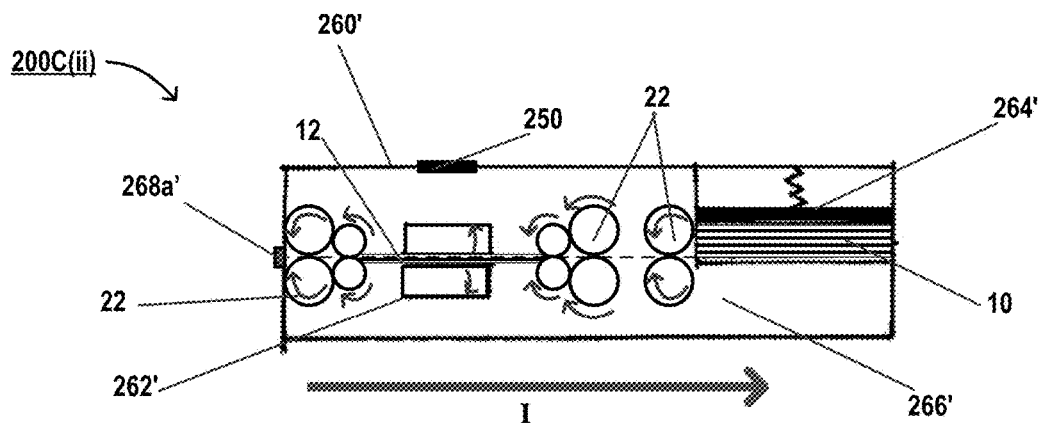
FIGURE 2C(ii)
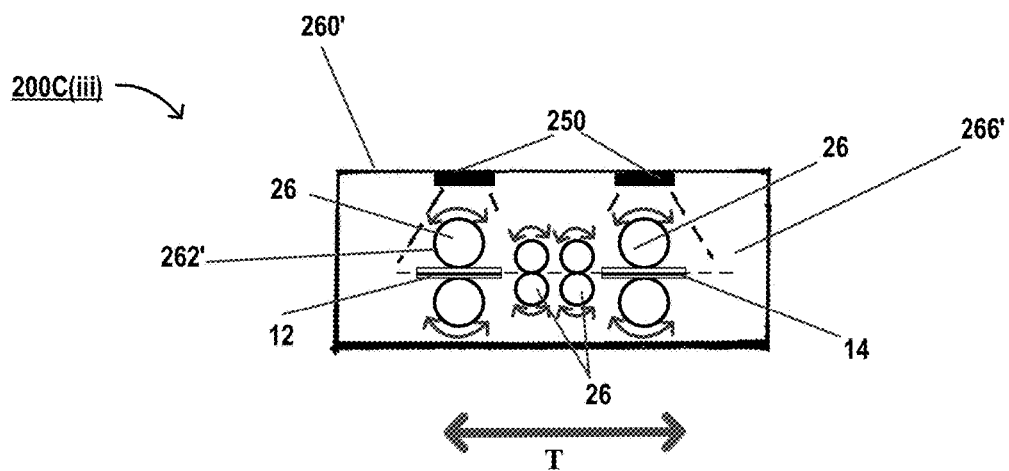
FIGURE 2C(iii)

US 10,467,842 B2

PORTABLE ITEM TRANSFER CONTAINER

FIELD OF THE INVENTION

The present invention embraces a portable item transfer container that typically includes an item storage unit and an item transfer unit configured to (i) dispense items stored in the item storage unit and (ii) receive items and store the items in the item storage unit. The portable item transfer container is typically configured to: receive an activity request from a user, wherein the activity request includes (i) a request to withdraw items or (ii) a request to store items; authenticate an identity of the user; determine that the location of the container is within an authorized region of the user; and in response to authenticating the identity of the user and determining that the location of the portable item transfer container is within the authorized region of the user, process the activity request.

BACKGROUND

There are various devices that can be used for dispensing or storing items. That said, a needs exists for improved way of dispensing and storing items.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

In some aspects, the present invention embraces a portable item transfer container and a method of transferring physical items via the portable item transfer container. The portable item transfer container typically includes: an item storage unit; an item transfer unit configured to (i) dispense one or more first items stored in the item storage unit and (ii) receive one or more second items and store the one or more second items in the item storage unit; an image capture device; and a communication device. The portable item transfer container also typically includes: a memory; a processor; an item inventory stored in the memory; and an item transfer application stored in the memory and executable by the processor. The item transfer application is typically configured for: receiving an activity request from a user, wherein the activity request includes (i) a request to withdraw the one or more first items or (ii) a request to store the one or more second items; authenticating an identity of the user; determining (i) an authorized region of the user and (ii) a location of the portable item transfer container; comparing the authorized region of the user and the location of the portable item transfer container and determining that the location of the portable item transfer container is within the authorized region of the user; and, in response to authenticating the identity of the user and determining that the location of the portable item transfer container is within the authorized region of the user, processing the activity request. If the activity request includes the request to withdraw the one or more first items, processing the activity request includes: determining, based on the item inventory, that the one or more first items are located in the item storage unit; transmitting, via the communication device, a withdrawal authorization request to a processing system; receiving, via the communication device, an authorization from the processing system; in response to determining that the one or more first items are located in the item storage unit and receiving the authorization from the processing system, dispensing, via the item transfer unit, the one or more first items; and updating the item inventory to reflect that the one or more first items have been dispensed. If the activity request includes the request to store the one or more second items, processing the activity request includes: receiving the one or more second items, via the item transfer unit, and storing the one or more second items in the item storage unit; capturing an image, via the image capture device, of each of the one or more second items; processing the image of each of the one or more second items to identify each of the one or more second items; updating the item inventory to reflect that the one or more second items have been received; and transmitting, via the communication device, a storage notification to the processing system indicating that the one or more second items have been stored by the user.

In a first particular embodiment, the portable item transfer container includes a geo-positioning device, wherein the item transfer application is configured for determining the location of the portable item transfer container via the geo-positioning device.

In a second particular embodiment, either alone or in combination with the other particular embodiments, the portable item transfer container includes a user interface, wherein the item transfer application is configured for receiving, via the user interface, the activity request from the use.

In a third particular embodiment, either alone or in combination with the other particular embodiments, the item transfer application is configured for receiving, via the communication device, the activity request from a mobile device of the user.

In a fourth particular embodiment, either alone or in combination with the other particular embodiments, the activity request includes the request to withdraw the one or more first items.

In a first aspect of the fourth particular embodiment, an item transfer system includes the portable item transfer container and the processing system, wherein the processing system is configured for: receiving the withdrawal authorization request from the portable item transfer container; determining that the user is authorized to withdraw the one or more first items; and, in response to determining that the user is authorized to withdraw the one or more first items, transmitting the authorization to the portable item transfer container. The request to withdraw the one or more first items may include a request to withdraw cash of a withdrawal amount. Determining that the user is authorized to withdraw the one or more first items may include determining that an account balance of the user is greater than the withdrawal amount. In addition, the processing system may be configured for reducing the account balance by the withdrawal amount.

In a fifth embodiment particular embodiment, either alone or in combination with the other particular embodiments, the activity request includes the request to store the one or more second items.

In a first aspect of the fifth particular embodiment, an item transfer system includes the portable item transfer container and the processing system, wherein the processing system is configured for receiving the storage notification from the portable item transfer container. The one or more first items may include cash or one or more checks. Processing the activity request may include determining an aggregate amount of the one or more first items and notifying the processing system of the aggregate amount. In addition, the processing system may be configured for increasing an account balance of the user by the aggregate amount.

In a sixth particular embodiment, either alone or in combination with the other particular embodiments, the portable item transfer container comprises: a secure physical housing enclosing an internal cavity, wherein the item transfer unit and the item storage unit are located in the internal cavity within the secure physical housing; an input portal located in the secure physical housing configured for receiving the one or more second items from the user; an output portal located in the secure physical housing configured for dispensing the one or more first items from the portable item transfer container; an input receptacle located proximate the input portal configured for storing the one or more second items; and an output receptacle located proximate the output portal configured for temporarily storing the one or more first items; wherein the item transfer unit further comprises: an input mechanism for receiving the one or more second items via the input portal and storing the one or more second items in the input receptacle and the item storage unit; a transfer mechanism for moving the one or more second items stored in the input receptacle to the output receptacle; and an output mechanism for dispensing the one or more first items via the output portal.

In a seventh particular embodiment, either alone or in combination with the other particular embodiments, the item transfer application is configured for: receiving the one or more second items, via the input portal; storing, via the input mechanism, the one or more second items in the input receptacle; capturing an image, via the image capture device, of each of the one or more second items; processing the image of each of the one or more second items to identify an item type for each of the one or more second items; based on identifying an item type for each second item of the one or more second items in the input receptacle, (i) storing the second item, via the input mechanism, in the item storage unit based on identifying that the second item is of a predetermined item type, or (ii) transferring, via the transfer mechanism, the second item to the output receptacle, based on identifying that the second item is not associated with the predetermined item type; and based on determining that (i) the input receptacle does not contain any of the one or more second items and that (ii) the output receptacle has at least one second item of the one or more second items, transferring, using the transfer mechanism, the at least one second item that is not associated with the predetermined item type from the output receptacle for storage in the input receptacle.

In an eighth particular embodiment, either alone or in combination with the other particular embodiments, the item transfer application is configured for: receiving the activity request from the user to withdraw the one or more first items; in response to determining that the one or more first items are located in the input receptacle, determining a minimum number of first items to be moved for dispensing the one or more first items; transferring, via the transfer mechanism, the minimum number of first items from the input receptacle to the output receptacle; and for each first item of the minimum number of first items in the output receptacle, (i) dispensing, via the output mechanism, the first item through the output portal, based on identifying that the first item matches the user request, or (ii) transferring, via the transfer mechanism, the first item to the input receptacle for storage, based on identifying that first item does not match the user request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
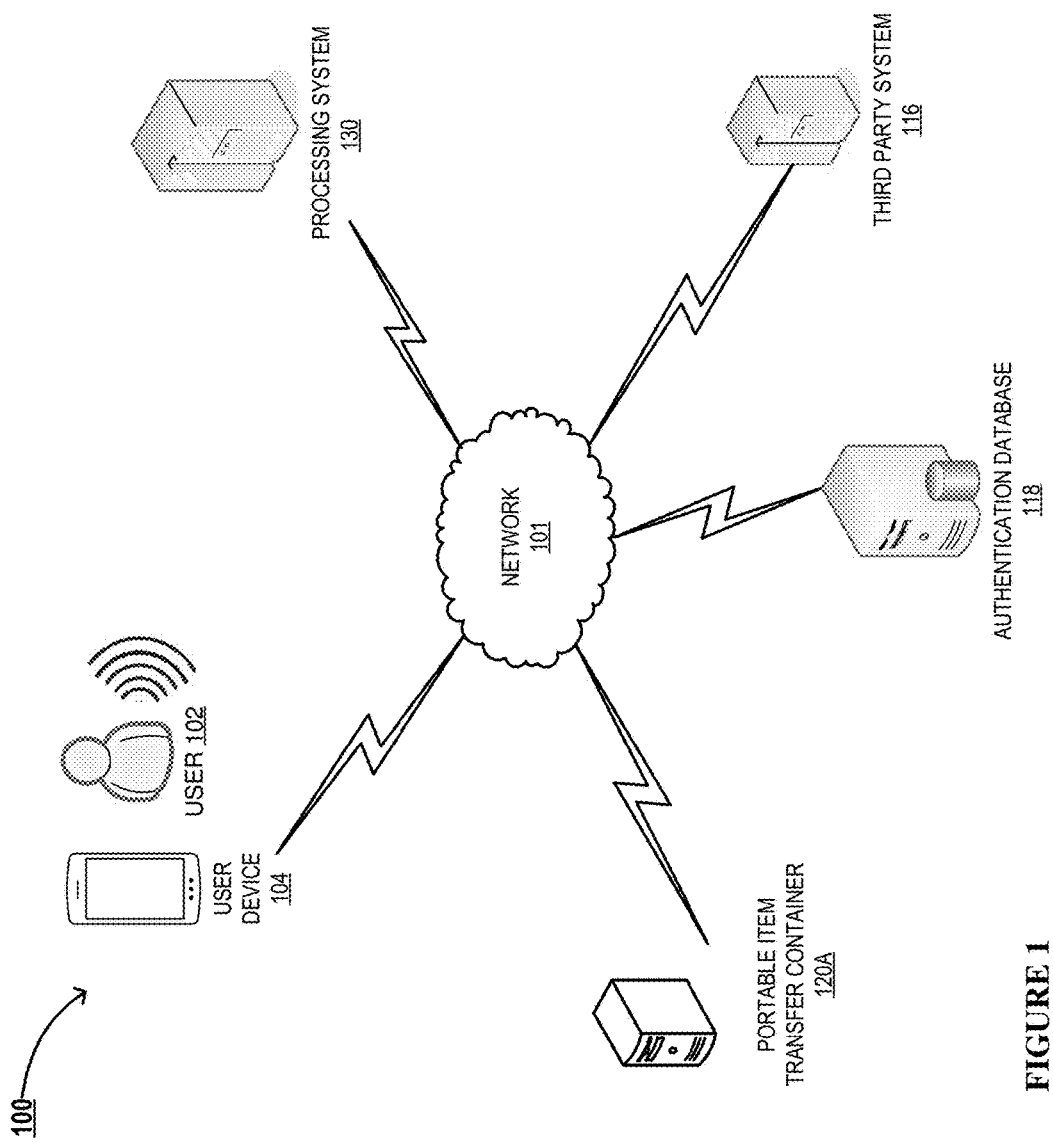
FIG. 1 illustrates a block network architecture diagram illustrating a system environment 100 for providing the transfer of items via portable item transfer containers, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with network connected portable item transfer containers and a corresponding processing system. As such, the entity may be any institution, group, association, financial institution, merchant, establishment, company, union, authority or the like. Typically, the entity is associated with one or more portable item transfer containers. Typically, the entity owns, operates, provides, facilitates services associated with, and/or is otherwise associated with the portable item transfer containers and corresponding processing system.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a portable item transfer container, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and devices described herein. In other embodiments, a user may be a system or an entity performing one or more tasks described herein.

An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. As used herein, an "online banking account" is an account that is associated with one or more user accounts at a financial institution. For example, the user may have an online banking account that is associated with the user's checking account, savings account, investment account, and credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

The term "portable item transfer container" as used herein may refer to one or more portable item transfer containers that facilitate one or more user activities or transactions, such as transferring physical items. Typically, a portable item transfer container is configured to facilitate performance of one or more user activities by establishing an "interactive session" between a user and the portable item transfer container. As such, the terms "user activity" or "user transaction" or simply "activity" may refer to financial or non-financial activities, tasks, events or actions. In some embodiments, the portable item transfer container facilitates execution of financial transactions or activities. In some embodiments, the portable item transfer container may facilitate execution of non-financial user activities or transactions. In embodiments described herein, performing a user activity or transaction may refer to the initiation, stages during the processing, or completion of a transaction.

Typically, the user may provide authentication credentials for conducting user activities or transactions at the portable item transfer container. In some embodiments, portable item transfer containers require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with user. In some embodiments, the user may be at least partially authenticated based on a determination that a defined physical item (e.g., the user's mobile device is collocated with the user. For example, the portable item transfer container may determine that the user's mobile device is collocated with the user at the portable item transfer container based on comparing GPS coordinates received from the mobile device with GPS coordinates of the portable item transfer container.

Many of the embodiments and example implementations thereof described herein are directed toward solving technical problems associated with the transfer of physical items. The physical items or "items", in general, typically refer to objects or artifacts that are processed (e.g., by the container 120A described herein) for performing one or more user activities, such as, cash, bills, checks, items associated with a certain value, and the like. In addition to the foregoing, in some embodiments of the invention, the physical items or items may refer to items or objects (e.g., purchase orders, legal documents, certificates, or other items/artifacts that may be sought to be securely transported or moved) that are securely managed and securely transported (e.g., using the container 120A described herein) from one geographic location to another. In the financial context, a user may wish to deposit physical items (e.g., cash or checks) and have the value of such physical items credited to an account, for example, in real-time. In addition, a user may wish to withdraw funds from an account in the form of physical items (e.g., cash). These transfers are typically performed either at a physical location of a financial institution (e.g. at a bank branch) or by using an automated teller machine (ATM). One of the problems associated with performing a transfer at a physical location of a financial institution or by using an ATM is that locations of financial institutions and ATMs are typically static and may be inconveniently located for many users. In addition, financial institution locations and ATMs are typically located in public spaces. Accordingly, other individuals in those spaces may be able to perceive information displayed on a display of an ATM or otherwise obtain information about transactions being performed by users. Accordingly, users may feel uncomfortable transferring physical items in such public spaces. Additionally, deposited items are typically periodically collected for further processing, and items intended for withdrawal are typically periodically refilled after becoming depleted. For example, an ATM may run out (or nearly run out) of cash of a certain denomination, and the operating financial institution may then delivery cash to the ATM of such depleted denomination. Constantly collecting depositing items and refilling items that have been depleted places a strain on the supply chain of a financial institution. In addition, if depleted items are not replenished quickly enough, users may be unable to withdraw such items. In certain instances, a user may seek to securely transport one or more items (e.g., purchase orders, legal documents, certificates, and the like) to another user in an entity facility location, either based on directions received by the user or automatically based on analyzing the item to identify the recipient. Furthermore, for secure transportation, the recipient may need to be authenticated prior to dispensing the items to the recipient.

In order to solve these technical problems, in one aspect, the present invention relates to a portable item transfer container which a user may use to deposit items or withdraw items. In some embodiments, the portable item transfer container is configured to be moved or carried to a location by a user (for example, the location may be within a facility location or within a predetermined area). As such, a user may be able to complete an item transfer at a location where the user feels secure, rather than in a public space. In order to further enhance security, functionality provided by the portable item transfer container may be location-specific. For example, a user may only be able to complete certain transactions if the portable item transfer container is at certain location, which may be been predefined by the user and/or an entity. By way of further example, a first user might only be able to withdraw cash from the portable item transfer container when the portable item transfer container is located at the first user's residence, whereas a second user might only be able to withdraw cash from the portable item transfer container when the portable item transfer container is located at the second user's place of business. As another example, in some embodiments, a first user might only be able to withdraw cash from the portable item transfer container when the portable item transfer container is located indoors or inside a building location of an entity facility, whereas a second user might only be able to withdraw cash from the portable item transfer container when the portable item transfer container is located at the second user's specific office room and not in a common area of the entity facility.

In some embodiments, the portable item transfer container maintains an inventory of the items it stores. As items are withdrawn from the portable item transfer container or deposited into the portable item transfer container, the portable item transfer container typically updates the item inventory, for example, in real time. Based on the maintaining the item inventory, the portable item transfer container may be able to identify a surplus or deficiency of any types of items stored by the portable item transfer container. In the event that the portable item transfer container determines that it has a surplus or deficiency, the portable item transfer container may obtain items and/or exchange items with another portable item transfer container or with a resource terminal (e.g., ATM) when the portable container is docked in a container receptacle of the resource terminal.

In some embodiments, the portable item transfer container is able to recycle items that have been deposited in the portable item transfer container. In this regard, instead of having separate containers for items that may be dispensed by the portable item transfer container and items that have been deposited in the portable item transfer container by a user, deposited items and items that may be dispensed are typically stored together in a common container. By storing items in a common container and by maintaining an accurate inventory of stored items, the portable item transfer container may receive items (e.g., cash) from one user and then subsequently dispense those same items to a different user, while being able to accurately and instantaneously update their respective accounts. By recycling at least some deposited items, the present invention is able to reduce the frequency of which the portable item transfer container runs out of certain types of items.

Referring to FIG. 1, a block diagram illustrating a system environment 100 configured for providing the transfer of items via portable item transfer containers, is illustrated, in accordance with some embodiments of the invention. As illustrated, the system environment 100 may include an portable item transfer container 120A, in operative communication with one or more user devices 104 associated with a user 102, a processing system 130, an authentication database 118, a third party system 116, and/or other systems/devices not illustrated herein, via a network 101. As such, each portable item transfer container 120 is typically configured such that the user 102 may perform one or more user activities or transactions by utilizing the portable item transfer container directly (for example, by physically operating the portable item transfer container 120 and its interfaces, using input/output devices of the portable item transfer container 120, using audio commands, using physical gestures, and the like) and/or via communication between the user device 104 and the portable item transfer container 120 (for example, by establishing operative communication channels between the user device 104 and the portable item transfer container 120 via a wireless network and interacting with the portable item transfer container 120 via the devices and interfaces of the user device 104).

Typically, the processing system 130 and the authentication database 118 are in electronic communication with each portable item transfer container 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the portable item transfer container 120A). In this regard, the wireless communication channel may further comprise near field communication (NFC), communication via radio waves, communication through the internet, communication via electromagnetic waves and the like.

As discussed previously, the portable item transfer container 120A is typically configured to allow the user 102 to transfer one or more items, and is configured to provide real-time interactive sessions for the user 102. The components of each portable item transfer container 120, its features and functions will be described in detail throughout this disclosure and with respect to FIG. 2A, in particular.

As alluded to previously, the processing system 130 is typically in operative communication with the portable item transfer container 120A. In some embodiments, the processing system 130 is configured to transmit control instructions that are configured to cause the portable item transfer container 120A, and/or the user device 104 to perform at least a portion of the steps associated with one or more activities. The processing system 130 may be associated with the same entity as the portable item transfer container 120A or may be associated with another entity. The structure and components of the processing system 130 are described in detail with respect to FIG. 3. The portable item transfer container 120A may further communicate with the third party system 116 and/or the authentication database 118, either directly or via the processing system 130. The authentication database 118 may comprise authentication credentials associated with the user. The processing system 130 and/or the portable item transfer container 120A may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the portable item transfer containers 120 of the present invention are configured to establish operative communication channels with the user device 104 such that, the user 102 may perform one or more user activities, either entirely or in part, at an portable item transfer container 120 by interacting with the user device 104. The user device 104 is described in detail with respect to FIG. 4.

Figure 2A:
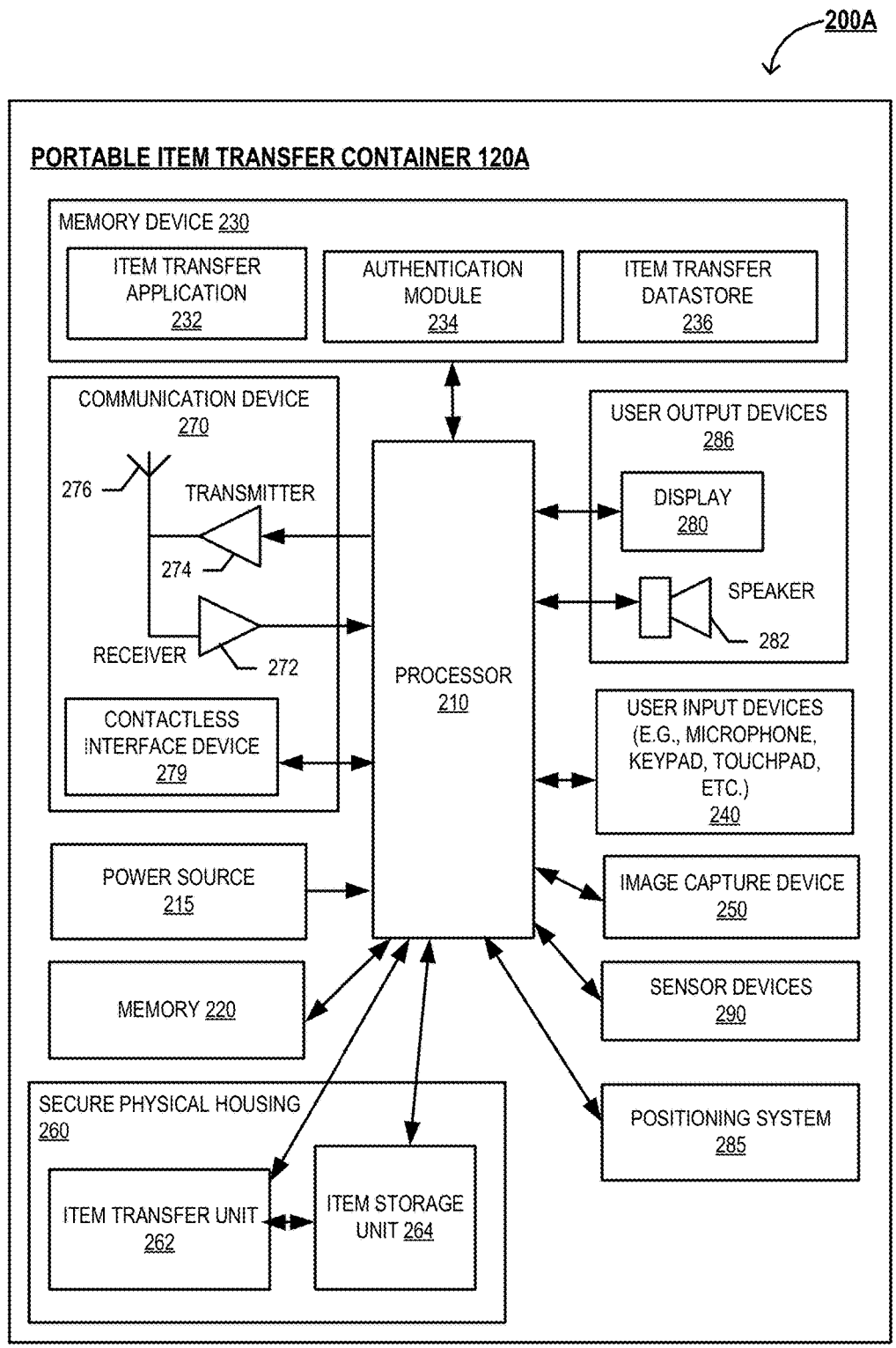
FIG. 2A illustrates a block diagram 200A of an portable item transfer container, in accordance with an embodiment of the invention.

FIG. 2A, illustrates a block diagram 200 of the portable item transfer container 120A, in accordance with some embodiments of the invention. As discussed previously, the portable item transfer container 120A is configured to facilitate performance of user activities, such as transferring physical items, and is typically configured to provide real-time interactive sessions for the user 102. The portable item transfer container 120A typically includes a processing device or a processor 210, memory device 230, storage memory 220 or datastore 220, and a communication device 270. As such, the portable item transfer container 120A, and the processor 210 is particular, is configured to perform at least a portion of the steps of the embodiments described herein, either based on executing computer readable instructions stored in the memory device 230, by causing other devices and systems (such as the user device 104) to perform one or more steps described herein, and/or based on receiving instructions, indications, or signals from other systems and devices such as the processing system 130, the user device 104, and/or other systems. In some embodiments, the processing system 130 is configured to transmit control instructions to, and cause the processor 210 of the portable item transfer container 120A to perform one or more steps of the embodiments presented herein.

The processor 210 may generally refer to a device or combination of devices having circuitry used for implementing the communication and/or logic functions of the portable item transfer container 120A. For example, the processor 210 may include a control unit, a digital signal processor device, a microprocessor device, and various analog-to-digital converters, digital-to-analog converters, and other support circuits and/or combinations of the foregoing. Control and signal processing functions of the portable item transfer container 120A may be allocated between these processing devices according to their respective capabilities.

The portable item transfer container 120A may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the portable item transfer container 120A, such as an image capture device 250, sensor devices 290, an item transfer unit 262, and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium comprising executable instructions that when executed by the processor 210, cause the processor to perform one or more functions of the portable item transfer container 120A. For example, the memory device 230 and/or the storage memory 220 may include any computer memory that provides an actual or virtual space to temporarily or permanently store data and/or commands provided to the processor 210 when it carries out its functions described herein.

As illustrated by FIG. 2A, the memory device 230 typically comprises an item transfer application 232, an authentication module 234, an item transfer application datastore 236 stored therein. In some embodiments, the authentication module 234 is integral with the item transfer application 232. In some embodiments, the item transfer application 232 and/or the authentication module 234 may be executable to initiate, perform, complete, and/or facilitate one or more portions of any embodiment described and/or contemplated herein, either independently or in response to receiving control instructions from the processing system 130. In some embodiments, the item transfer application 232 comprises computer readable instructions stored in the memory device 230, which when executed by the processor 210, are configured to cause the processor 210 to perform one or more steps of the embodiments presented herein, and/or cause the processing device to transmit control instructions to other components of the portable item transfer container 120A and other devices/systems in the network 101 to cause them to perform the steps. Generally, the item transfer application 232 is executable to receive activity instructions from the user and perform various functions in addition to the specific steps of the embodiments presented herein, as appreciated by those skilled in the art. The item transfer application 232 may be coupled to an item transfer datastore 236 for storing application data as user activities are being performed. The item transfer datastore 236 may store the application data temporarily for the predetermined duration of the execution of the activity (such as a memory buffer, or cache memory), or permanently. In some embodiments, the item transfer datastore 236 includes an inventory of items located in the item storage unit 264.

The portable item transfer container 120A may require users to identify and/or authenticate themselves before the portable item transfer container 120A may initiate, perform, complete, and/or facilitate a user activity. For example, in some embodiments, the portable item transfer container 120A is configured (and/or the item transfer application 232 is executable) to authenticate a user based at least partially on a debit card, smart card, token (e.g., USB token, etc.), username, password, PIN, biometric information, and/or one or more other credentials that the user presents to the portable item transfer container 120A. Additionally or alternatively, in some embodiments, the portable item transfer container 120A is configured to authenticate a user by using one-, two-, or multi-factor authentication. For example, in some embodiments, the portable item transfer container 120A requires two-factor authentication, such that the user provides a valid debit card and enter the correct PIN associated with the debit card in order to authenticate the user to the portable item transfer container 120A. However, either alternatively or in addition to the aforementioned authentication features, the portable item transfer container 120A may require biometric authentication of the user 102 before initiating, performing, completing, and/or facilitating a user activity. In some embodiments, these authentication credentials are received at the portable item transfer container 120A via input 240 and output 286 devices of the portable item transfer container 120A. In some embodiments, the authentication credentials are received via a user interface of the user device 104.

In some embodiments, the authentication module 234 comprises computer readable instructions that when executed by the processor 210 cause the processing device to perform one or more functions and/or transmit control instructions to other components or devices (such as the user device 104) to perform one or more authentication steps described herein. These authentication steps typically include requesting authentication credentials from the user via the user output devices 286 and/or via user interfaces/output devices of the user device 104 (for example, based on determining the desired authorization level for the user activity), activating pertinent sensors and devices for receipt of the credentials (for example, sensor devices 290/image capture devices 250 for biometric credentials, card reader devices for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processor 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the portable item transfer container 120A, between the portable item transfer container 120A, particularly the processor 210, and other devices or systems, such as the processing system 130, the user device 104, the authentication database 118, the third party system 116, and the like. In this regard, the communication device 270 typically comprises a transmitter 274, a receiver 272, a broadcasting device 276 to transmit and receive signals from corresponding devices via a suitable transmission medium or a communication channel. In some embodiments, the portable item transfer container 120A is configured to be coupled/connected to other devices and systems via wired communication channels. In other embodiments, the portable item transfer container 120A is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the portable item transfer container 120A may include a transceiver, i.e., one or more antennas and and/or other electronic circuitry, devices, and software, for receiving data when a device is held close to or tapped at a suitable location of the portable item transfer container 120A. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the portable item transfer container 120A within a distance of up to approximately 25 cm, and from 0-20 cm, such as from 0-15 cm, and 0-10 cm, and the like. Specifically, the communication device may employ NFC channel features described above to operatively communicate with the user device 104.

Establishing the communication channels may also include signaling information in accordance with the air interface standard of the applicable cellular system of the wireless telephone network that may be part of the network 101. In this regard, the portable item transfer container 120A may be configured to operate with one or more air interface standards, communication protocols, modulation types, and access types. By way of illustration, the portable item transfer container 120A may be configured to operate in accordance with any of a number of first, second, third, and/or fourth-generation communication protocols and/or the like. For example, the portable item transfer container 120A may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The portable item transfer container 120A may also be configured to operate in accordance with non-cellular communication mechanisms, such as via a wireless local area network (WLAN) or other communication/data networks.

The user interface of the portable item transfer container 120A may include user input devices 240 and user output devices 286, as illustrated by FIG. 2A. The user interface of the portable item transfer container 120A is typically configured to facilitate the interactive sessions with the user. The user output devices 286 typically include a display 280

(e.g., a liquid crystal display, a touchscreen display, and/or the like) which is operatively coupled to the processor 210. In some embodiments, where the portable item transfer container 120A requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface may include any number of user input devices 240 allowing the portable item transfer container 120A to transmit/receive data to/from the user 102, such as a keypad, keyboard, touch-screen, touchpad, card reader, microphone, mouse, joystick, other pointer device, button, soft key, and/or other input device(s). A printer that can print paper receipts, for example, at the completion of a user activity, may also be incorporated into the portable item transfer container 120A. That said, the portable item transfer container 120A may also be configured to transmit electronic receipts to the user. For example, the container 120A may transmit an electronic receipt to the user device 104 via a NFC communication channel established using the contactless interface device 279.

In some embodiments, the user output device 286 is an interface headset (not illustrated), that is typically configured to be adorned by the user 102 and is operatively coupled to the portable item transfer container 120A via wireless communication channels. These wireless communication channels may be encrypted to ensure the security of user data. The interface headset is configured to provide augmented reality and virtual reality experiences to the user as the user is performing one or more user activities at the portable item transfer container 120A.

The portable item transfer container 120A typically includes an item storage unit 264 for storing physical items. The physical items may include cash and/or checks. The portable item transfer container 120A also typically includes an item transfer unit 262. The item transfer unit 262 is typically in operative mechanical/physical and/or electronic communication with the item storage unit 264 and is typically configured to dispense items stored in the item storage unit 264, receive items (e.g., from a user), and store received items in the item storage unit 264. For example, the item transfer unit 262 may include one or more cash dispensers and deposit mechanisms. The secure physical housing 260, the item transfer unit 262, the item storage unit 264 of the portable item transfer container 120A will be described in detail below with respect to FIGS. 2B and 2C(i)-2D.

As illustrated by FIG. 2A, the portable item transfer container 120A may further comprise an image capture device 250. The image capture device 250 typically comprises cameras and other audio, video and image capture devices. The image capture device 250 may comprise one or more components. In some embodiments, one or more components of the image capture device 250 may be located within the secure physical housing 260, located on or proximate to an external surface of the secure physical housing 260, within or proximate to walls of the secure physical housing 260, and/or at input and/or output portals of the secure physical housing 260. In some embodiments, the image capture device 250 is typically configured to capture images of items being deposited into the portable item transfer container 120A and/or withdrawn from the portable item transfer container 120A (for example, in the instances where the device 250 or the components of the device are located within the housing 260 or at the at input and/or output portals of the housing 260). The images captured by the image capture device 250 may be analyzed by the portable item transfer container 120A in order to identify specific items being withdrawn or deposited. By identifying specific items being withdrawn or deposited, the portable item transfer container 120A may be able to maintain an accurate inventory of items located in the item storage unit 264. In some embodiments, and/or in combination with the above embodiments, the image capture device 250 is also configured to capture authentication credentials of the user (e.g., by identifying the user for authentication or facial recognition purposes). Here, for instance, one or more components of the image capture device may be located on or proximate to an external surface of the secure physical housing 260.

In some embodiments, the portable item transfer container 120A further comprises sensor devices 290. In some embodiments, the processor 210 communicates with, transmits instructions, and/or receives signals from the sensor devices 290, in real-time for detecting the presence of the users or other individuals, detecting proximity of other portable item transfer containers, determining user location, capturing authentication credentials for the user, determining parameters associated with the user, determining current location when navigating from one location to another, capturing one or more parameters associated with the environment or physical location of the portable item transfer container 120A, and the like. For example, the sensor devices 290 may include ultrasonic sensors, optical sensors, photoelectric sensors, capacitance sensors, inductive proximity/position sensors, visual capture devices (as described with respect to the image capture device 250), and the associated transducers, transmitter and modulators.

In some embodiments, the sensor devices 290 are position sensors configured to determine the position and/or location of the user 102, path/location markers within a facility, other individuals, objects/devices, or entities. As such, the sensor devices 290 may determine an absolute position (for example, location/positioning coordinates) or a relative position (for example, with respect to the position of the portable item transfer container 120A, with respect to position of the user or another individual, with respect to a position/location marker in a facility, with respect to the sensor device 290 itself or a predetermined object and the like) of the user, individual, other portable item transfer containers, container portals, or another object. Here, in some embodiments, the sensor devices 290 are proximity sensors that are configured to determine the presence of the user, other portable item transfer containers, container portals, or another object (for example, location markers/identifiers within the facility location) within a predetermined proximity area. These sensor devices 290 may be contact type sensors that determine the presence of the user or object based on contact, or non-contact type sensors that detect distant users or objects. Typically, the sensor devices 290 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor devices 290. The return signal/wave is then converted to an electric signal by a second transducer of the sensor. This electric signal may be analyzed, in real-time, by the sensor devices 290, the portable item transfer container 120A, and/or the processing system 130, to determine the location of the user/container/portal and/or track movement of the user/container/portal. Here, the sensor devices 290 may be configured to perform modulation, demodulation, amplification and output switching of the proximity and return signals.

For example, the sensor devices 290 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 290 comprise optical sensors or photoelectric sensors that are configured to transmit a proximity signal comprising electromagnetic waves, and specifically light waves (for example, infrared waves with frequencies in the range of about 600 GHz to 430 THz, such as pulsed infrared or visible red waves, laser waves in the visible or infrared frequency range, and the like) and are further configured to receive a return signal, either in the form of a reflection signal or interruption of the light proximity signal at receiver associated with the sensor devices 290, which is then converted to an electric signal for analysis. As yet another example, the sensor devices 290 comprise inductive proximity sensors and inductive position sensors for determining the presence and position, respectively, of users and objects, which generate an induction loop to thereby produce a proximity signal in the form or a magnetic field. The presence of users, other portable item transfer containers or objects varies the current flowing through the loop which facilitates determination of presence of users or objects. In some instances, objects of different materials vary the current distinctly. Therefore, analysis of the variation in the current flow enables identification of different types of objects.

In some embodiments, the image capture device 250 is configured to capture images or surroundings of the container 120A, real time video feeds of the surroundings, and the like. The images and/or video streams provided by the image capture device 250 may be analyzed by the portable item transfer container 120A (for example, by the processor 210) to determine the presence and position of the user, other individuals or objects and their movement in proximity to the portable item transfer container 120A. For example, these images and/or videos many then be analyzed, typically in real-time, to determine current location of the container 120A based on recognizing location markers or identifiers in the facility, and the like. Although described separately, it is understood that the image capture device 250 may be associated with the sensor devices 290. As such, sensors or sensor devices, as used herein, may refer to the various sensor devices described herein and the image capture devices described herein.

In some embodiments, the sensor devices 290 may include a positioning system 285, such as a geo-positioning system device. The position system 285 may provide location information (e.g., GPS coordinates) to the portable item transfer container 120A, and/or the processing system 130. This location information may then be used to aid the portable item transfer container 120A in determining its current location, determining authorization for a particular user activity and the like. As noted, the sensor devices 290 may also be configured to identify objects in the environment of the portable item transfer container 120A.

In some instances, the sensor devices 290 comprise biometric sensors for capturing parameters associated with the user, such as fingerprint scanners, voice recognition sensors, facial recognition sensors, and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 2B:
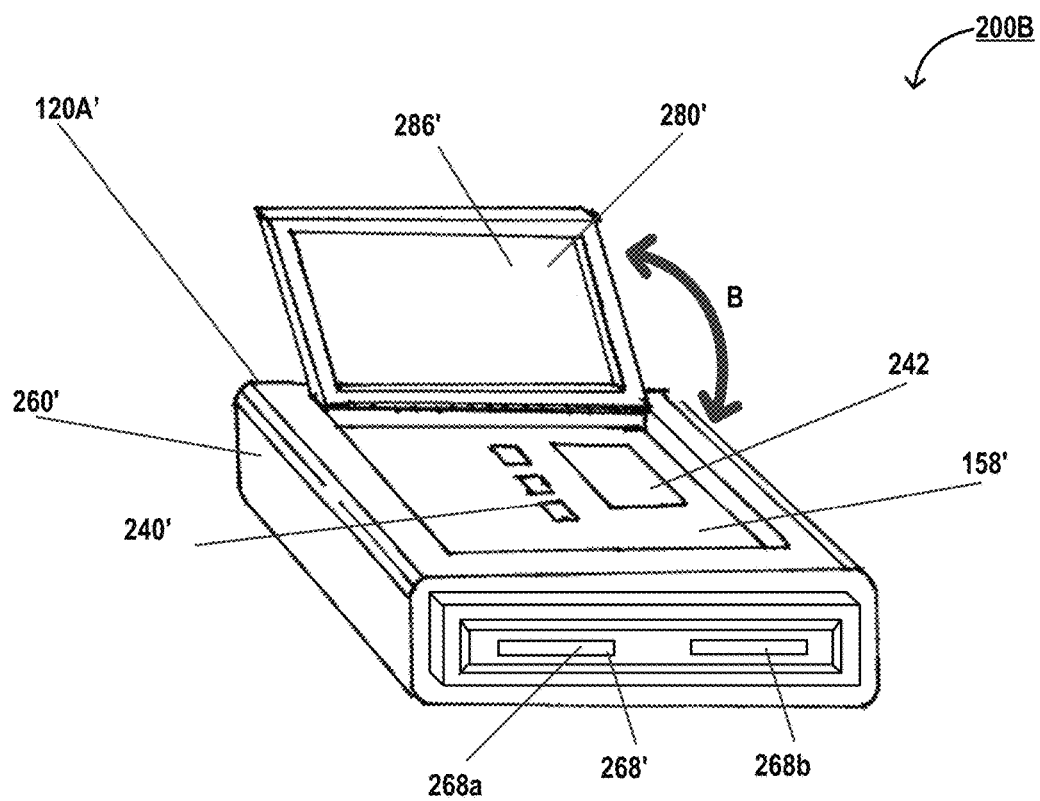
FIG. 2B illustrates a perspective view 200B of an portable item transfer container 120A, in accordance with an embodiment of the invention.

FIG. 2B illustrates a perspective view 200B of a portable item transfer container 120A, in accordance with some embodiments of the invention. The components, functions and features of the portable item transfer container 120A illustrated herein are similar to those described with respect to FIG. 2A. Specifically, FIG. 2B illustrates embodiments of the portable item transfer container 120A comprising a secure physical housing 260'.

The housing 260' is typically configured for physically separating an interior volume or cavity of housing from the external surroundings. The housing 260' is typically a rigid housing configured to withstand predetermined external stresses and strains and to provide tamper-proof protection for the contents stored in the cavity. In some embodiments, the conduit housing is manufactured from rigid materials that are typically strong enough to withstand predetermined impacts, stresses, strains, wear, buckling and flexure without adversely affecting its structural integrity. As such, the housing 260' may be manufactured out of suitable materials such as metals, alloys, plastics, composites, natural or synthetic materials, polymers and the like, or a combination thereof. Metallic materials may include suitable grades of stainless steel, carbon steels, other ferrous metals and alloys, aluminum and its alloys, tin, lead, and the like. Plastic materials may include polypropylene (PP), polycarbonate (PC), polyvinyl chloride, Low-density polyethylene (LDPE), Polystyrene (PS), Acrylonitrile butadiene styrene (ABS), and the like. Composite materials may include fiber-reinforced plastics, ceramic composites, metal matrices, metal composites, plywood, and the like.

Figure 2C:
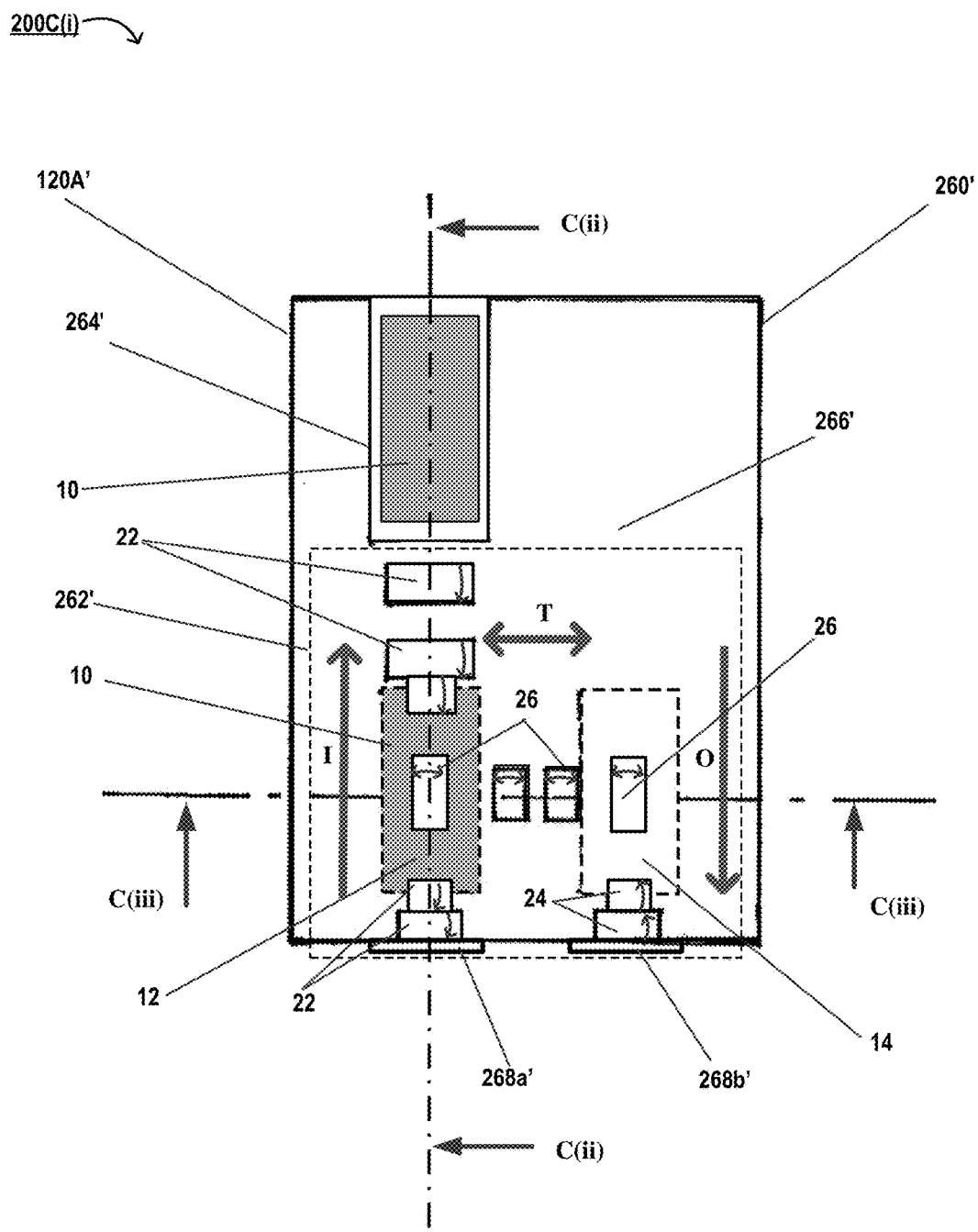
FIGS. 2C(i), 2C(ii) and 2C(iii) illustrate cutaway views of the portable item transfer container 120A of FIG. 2B, in accordance with an embodiment of the invention.

The housing 260' typically encloses the cavity 266' (illustrated in FIGS. 2C(i)-2D). In some embodiments, the housing 260' comprises a security portal or opening (not illustrated). Typically, the security portal is covered by a door with an internal lock, which when unlocked is configured to provide access into the cavity 266'. The internal lock is configured such that only authorized personnel or associates of the entity are allowed access into the cavity 266', for example, for the purposes of retrieving deposited checks, replenishing one or more types of items that are depleted in the container, and the like. Typically, the authorized personnel would require to insert a physical key or transmit smart authentication credentials or authorization tokens using a suitable user device/security device to unlock the internal key and retract the door for accessing the cavity 266'.

Moreover, the item transfer unit 262' and the item storage unit 264' are typically located in the cavity 266', within the housing 260', as illustrated in FIGS. 2C(i)-2D. As discussed previously, the item storage unit 264' is configured to store and manage one or more physical items (e.g., cash and/or checks), and the item transfer unit 262' configured to dispense items stored in the item storage unit 264, receive items (e.g., from a user), and store received items in the item storage unit 264, as will be described below with respect to FIGS. 2C(i)-2D. The housing 260' typically includes one or more portals 268' or container portals 268' (e.g., a input portal and an output portal, a combined input/output portal, a check input portal, and/or the like) configured to receive physical items into the cavity and the item transfer unit 262' in particular, and/or dispense one or more items out of the cavity through an opening of the portal. For example, FIG. 2B illustrates, an embodiment of the portable item transfer container 120A with an input portal 268a for receiving one or more items into the housing 260' and an output portal 268b for dispensing one or more items.

As further illustrated, in some embodiments, the portable item transfer container 120A further comprises user interface devices, configured for receiving authentication credentials from the user and configured for facilitating an interactive user session and execution of one or more steps of a user activity. The user interface devices may comprise an user authentication device 242 such as a biometric configured for receiving biometric credentials of the user or a magnetic card reader configured for reading a magnetic card strip associated with the user. The user interface devices may comprise user input devices 240' such as a keypad configured for receiving user input. The user interface devices may comprise user output devices 286' such as a display screen 280'. The display screen 280' illustrated in FIG. 2B (e.g., a liquid crystal display, a touchscreen display, and/or the like) may also serve as an input device to receive user input. As indicated by the direction B, the display screen 280' may be foldable to provide a contiguous outer surface to the housing 260'.

FIGS. 2C(i), 2C(ii) and 2C(iii) illustrate cutaway views of the portable item transfer container 120A of FIG. 2B, in accordance with various embodiments of the invention. Specifically, FIGS. 2C(i), 2C(ii) and 2C(iii) illustrate sectional views 200C(i), 200C(ii) and 200C(iii) of the secure physical housing 260' of the portable item transfer container 120A, depicting item dispensing and retrieving mechanisms in accordance with various embodiments of the invention. The functions and features of the portable item transfer container 120A illustrated herein are similar to those described with respect to FIGS. 2A and 2B. As discussed previously, the user may place one or more items for deposit into the portable item transfer container 120A, through the input portal 268a'. Furthermore, the portable item transfer container 120A may dispense one or more items to the user through the output portal 268b'. Specifically, FIGS. 2C(i), 2C(ii) and 2C(iii) illustrate one embodiment of the item transfer unit 262' and the item storage unit 264' for dispensing and retrieving one or more physical items to and from the portable item transfer container 120A. FIGS. 2C(i) to 2C(iii) illustrate mechanisms for receiving, storing and dispensing items 10 such as notes, checks, bills and the like. However, it is understood that the item transfer unit 262' and the item storage unit 264' may vary based on the items utilized.

FIG. 2C(i) illustrates a top cutaway view 200C(i) of the secure physical housing 260' of the portable item transfer container 120A of FIG. 2B. FIG. 2C(ii) illustrates a side sectional view 200C(ii) of the secure physical housing 260' of FIG. 2C(i) along the section C(ii)-C(ii), depicting the input mechanism for storing a received item in the item storage unit 264'. FIG. 2C(iii) illustrates a front sectional view 200C(iii) of the secure physical housing 260' of FIG. 2C(i) along the section C(iii)-C(iii), depicting the transfer mechanism for dispensing an item from the item storage unit 264'.

As illustrated in FIGS. 2C(i)-2C(iii), the secure physical housing 260' encloses a cavity 266' and comprises an input portal 268a' for receiving items and an output portal 268b' for dispensing items. The item transfer unit 262' and the item storage unit 264' (FIG. 2C(ii) illustrates a spring loaded storage unit 264') are typically located in the cavity 266', within the housing 260'. As discussed previously, the item transfer unit 262' is typically configured to receive one or more items 10 (e.g., from a user) and store received items 10 in the item storage unit 264, and dispense one or more items to a user. As illustrated, the item transfer unit 262' is configured to receive one or more items from a user via the input portal 268a' along an input direction I, and dispense one or more items via the output portal 268b' along an output direction O, typically, based on receiving control signals from the processor 210 (illustrated in FIG. 2A).

The item transfer unit 262' in this embodiment comprises an input receptacle 12 and an output receptacle 14. The input receptacle 12 is configured to store one or more received items 10, for example, in a stack. The output receptacle 14 is configured to store or hold, for example temporarily, one or more items 10 for dispensing through the output portal 268b'. The item transfer unit 262' comprises an input mechanism for receiving one or more items via the input portal 268a', and for moving the received items to and storing the items at the input receptacle 12 and/or the item storage unit 264. In this exemplary illustration of the embodiment, the input mechanism is illustrated as comprising a plurality of roller pairs 22 for receiving, moving and storing the items. The item transfer unit 262' comprises a transfer mechanism for transferring/moving items from the input receptacle 12 to the output receptacle 14 and an output mechanism for dispensing one or more items from the output receptacle 14 via the output portal 268b'. In this exemplary illustration of the embodiment, the transfer mechanism is illustrated as comprising a plurality of roller pairs 26 and the output mechanism is illustrated as comprising a plurality of roller pairs 24. Although illustrated as using rollers (roller pairs 22, 24 and 26), it is understood that the input, transfer and output mechanisms of the item transfer unit 262' may comprise other mechanisms such as robotic arms, suction cups, conveyor systems, cams, actuators, levers, linkages and the like, in addition to and/or instead of the roller pairs 22, 24 and 26 for moving, orienting and storing the items. Moreover, the secure physical housing 260' comprises one or more image capture devices 250 (illustrated in FIGS. 2C(ii) and 2C(iii)) for capturing images of received items at the input receptacle 12 and for capturing images of items prior to dispensing at the output receptacle 14.

The functioning of the input mechanism of the item transfer unit 262' will now be described, particularly with respect to FIGS. 2C(i) and 2C(ii). The user may provide one or more items for storage via the input portal 268a'. For example, the user may provide a plurality items 10 comprising one or more checks, one or more bills of type A and one or more bills of type B, either one after another or together in a randomly ordered stack. The input mechanism may then direct the received items into the input receptacle 12 along the input direction I, via the roller pairs 22. The system (e.g., the container 120A' via the processor 210) may then scan the received items at the input receptacle, for example, one after another, and update an item inventory of the container based on identifying the type and value of the received items. Next, the input mechanism may transport items of a predetermined type (e.g., items that are not likely to be dispensed to a user once processed, checks, bills of a particular type, checks, bills of a particular type, and the like) to the item storage unit 264' using the roller pairs 22 along the input direction I. Continuing with the previous example of the plurality of input items, the system may request the user to provide the items one after another. Based on receiving a first item of a bill of type A, the system may direct the item to the input receptacle 12 and scan the item using the image capture device 250. The system may then update the item inventory. Next the system may receive second item of a check from the user. The system may move the check, via the rollers 22, into the input receptacle such that the check is above the first item of bill type A in the receptacle 12. In response to determining the item is a predetermined type of item (e.g., a check), via the image capture device 250, the system may further move the check to the spring loaded item storage unit 264' along the input direction I, using the roller pairs 22. Here, the system may further maintain a input receptacle inventory and an item storage unit inventory indicating the specific items stored in the receptacle 12 and the storage unit 264', and the order in which they are stored in the stack. In this example, the input receptacle inventory would indicate the bill of type A and the item storage unit inventory would indicate the check. Next, the container may receive a third item of a bill of type B, direct the item to the receptacle 12, scan the item using the image capture device 250, and update the item inventory of container and the input receptacle inventory. Similarly the system may receive and store all of the plurality of items that the user seeks to deposit.

Continuing with the previous example, alternatively, the user may provide the plurality of items comprising one or more bills of type A, one or more checks and one or more bills of type B, in any order, as a stack. The system then moves the stack of items, via roller pairs 22, to the input receptacle 12. The system then scans the topmost item (e.g., a bill of type A) on the stack on the input receptacle 12, and update the item inventory. Next, the system may move the scanned bill from the input receptacle 12 to the output receptacle 14 for temporary storage, along transfer direction T, using the roller pairs 26 of the transfer mechanism (illustrated in FIG. 2C(iii)). Consequently, another item (e.g., a check) may be on the top of the stack on the input receptacle 12. After scanning the item and based on determining that the item is of a predetermined type, the system may move the check to the item storage unit 264' using the roller pairs 22. Similarly, after scanning the next item in the stack, the system move successively move the item from the top of the stack in the input receptacle 12 (i) to the item storage unit 264' based on determining that the item is of a predetermined type, or (ii) to the output receptacle 14 based on determining that the item is not of a predetermined type. When all the items provided by the user are scanned and the inventory is updated, the system may sequentially move the scanned items in the output stack 14 back to the input stack 12 using the transfer mechanism (illustrated in FIG. 2C(iii)). Hence, all the items of a predetermined type (e.g., items that are not dispensed such as checks, certain types of bills such as bills of a certain denomination) are stored in the item storage unit 264', while the rest are stored in the input receptacle 12. Here, the processor 210 may selectively actuate the relevant roller pairs in a suitable direction for performing the aforementioned steps.

The functioning of the output mechanism of the item transfer unit 262' will now be described, particularly with respect to FIGS. 2C(i) and 2C(iii). The user request dispensing of one or more items. For example, the user may request dispensing of two items of type A and one item of type B. The input receptacle 12 may comprise a plurality of items in the following order, from top to bottom, item types: A, D, B, A, E, A, and B. The system may then analyze the inventory of the input receptacle 12 and determine the minimum number of items to be moved for fulfilling the request. In this example, the system may determine that that fulfilling the user request requires items in the positions 1, 2 and 4 from the top, and hence requires movement of at least 4 items. Subsequently, the system may move the minimum number of items, i.e., the first four items (A, D, B, A), from the top of the stack in the input receptacle 12 to the output receptacle 14 in the direction T, using the rollers 26 of the transfer mechanism, either sequentially or at once in bulk, and update the receptacle inventory. In some embodiments, for example, when the items are sequentially moved from the input receptacle 12 to the output receptacle 14 the order of the items may be reversed (A, B, D, A), while in the embodiments where the minimum number of items are moved in bulk or at once, their order from the input mechanism is preserved.

Next, from the items in the stack of the output receptacle 14, the system may (i) dispense the topmost item of the receptacle 14 through the output portal 268b' to the user based on determining that the topmost item matches the items of the user request, or (ii) move the topmost item of the receptacle 14 back to the input receptacle 12 using the rollers 26, based on determining that the topmost item does not matches the items of the user request, until the output receptacle is empty. Here, the system may evaluate the matching based on the item position count and order of the stack and/or based on analyzing an image of the topmost item in the receptacle 14 captured by the image capture device 250. Continuing with the previous example, the items in the output receptacle may be in the order of A, B, D, A from top to bottom. Here, the system may dispense the topmost item A via the output portal 268b' and the roller pairs 24 based on ascertaining that the user requested a least one item of type A. Similarly, the system may dispense item B. Next, the system may move the item D back to the input receptacle 12 based on determining that the item does not match the user request, and update the inventory accordingly. Finally, the system may dispense the next item A to the user. In some embodiments, the system may retrieve one or more items from the item storage unit 264' and place them in the input receptacle 12 using the roller pairs 22, in the output direction. The system may then dispense these items via the output portal 268b' in the manner described above.

Figure 2D:
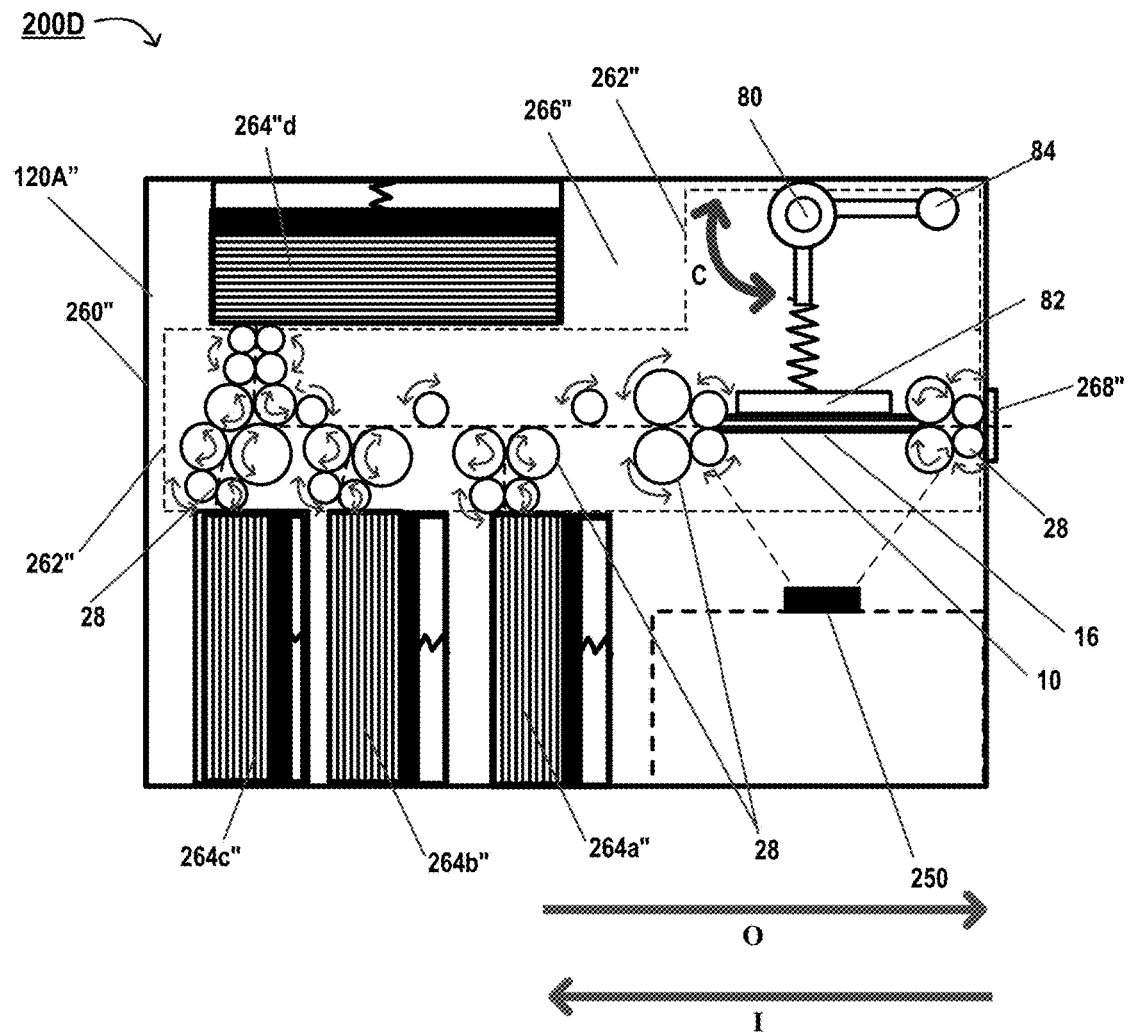
FIG. 2D illustrates a cutaway view of the portable item transfer container 120A of FIG. 2B, in accordance with an embodiment of the invention.

FIG. 2D illustrates a cutaway view of the portable item transfer container 120A of FIG. 2B, in accordance with various embodiments of the invention. Specifically, FIG. 2D illustrates a side sectional view of the secure physical housing 260" of the portable item transfer container 120A", depicting item dispensing and retrieving mechanisms, in accordance with various embodiments of the invention. The functions and features of the portable item transfer container 120A" illustrated herein may be substantially similar to those described with respect to FIGS. 2A-2B. Specifically, FIG. 2D illustrates an embodiment of the secure physical housing 260" comprising a single, dual input/output item portal 268" (or portal 268") that is configured for both receiving items from the user and dispensing items to the user.

As illustrated, the secure physical housing 260" encloses a cavity 266" and comprises the portal 268" for receiving and dispensing items. The housing 260" encloses an item transfer unit 262" and a plurality of item storage units (264a"-264d"). Each item storage unit may be associated with or utilized to store a particular type of item. For example, the item storage unit 264b" may be utilized to store items of type B. The item transfer unit 262" comprises an item receptacle 16 for temporarily holding items 10 (for example, for capturing an item image using the image capture device 250) and a plurality of roller pairs 28 for transporting the items within the housing 260". The item receptacle 16 may be a container or may be an area/space for holding the items. The item transfer unit 262" further comprises an item holding device 80 for suitably holding/moving the items from the receptacle 16. The item transfer unit 262" is configured to receive one or more items from a user via the portal 268" along an input direction I, and dispense one or more items via the same portal 268" along an output direction O, typically, based on receiving control signals from the processor 210 (illustrated in FIG. 2A) at the appropriate roller pairs 28 and the item holding device 80.

The functioning of the input mechanism of the item transfer unit 262" will now be described. The user may provide one or more items for storage via the portal 268". For example, the user may provide a plurality items 10 comprising one or more checks, one or more bills of type A and one or more bills of type B, either one after another or together in a randomly ordered stack. The input mechanism may then direct the received items into the receptacle 16 along the input direction I, via the roller pairs 28 nearest the portal 268". Here, the system may employ a first spring biased end 82 of the item holding device 80 to temporarily hold the items until their images are captured. The system may then scan the topmost item in the input receptacle (i.e., the item most proximate to the image capture device 250 and away from the first spring biased end 82) using the image capture device, and update an item inventory. The system may then cause rotation of the item holding mechanism 80 along the direction C to cause a second roller end 84 to be positioned proximate the receptacle 16 and to cause the first spring biased end to be positioned away from the receptacle 16 (illustrated in FIG. 8B). The system may then move the scanned item, via the roller pair 28 and the roller end 84, to an item storage unit associated with the type of the item. In this manner, the system may sequentially scan, record and store all of the user input items. Continuing with the previous example, the system may store the bills of Type A in an item storage unit 264a", the bills of Type B in the item storage unit 264b", and the checks in an item storage unit 264d".

For dispensing the items, the system may receive a request from a user to dispense one or more items (for example, 5 items of type A and 2 items of type B). The system may then engage the item holding device 80 such that the first spring biased end 82 is proximate the receptacle 16. Next, the system may move the user requested items from the corresponding item storage units in the output direction O, either sequentially or in groups, and place them in the receptacle 16. Here, the system may also capture images of the items using the image capture device 250 to ensure that the items match the user request. Once all the user requested items have been gathered/placed in the receptacle 16 and the item inventory has been updated, the system may rotate the item holding device such that the second roller end 84 engages the items in receptacle 16 and subsequently dispense the user requested items from the portal 268". Continuing with the previous example, the system may retrieve 5 items of type A from the item storage unit 264a" and 2 items of type B from the item storage unit 264b", gather them at the receptacle 16 and dispense them via the portal 268".

Figure 3:
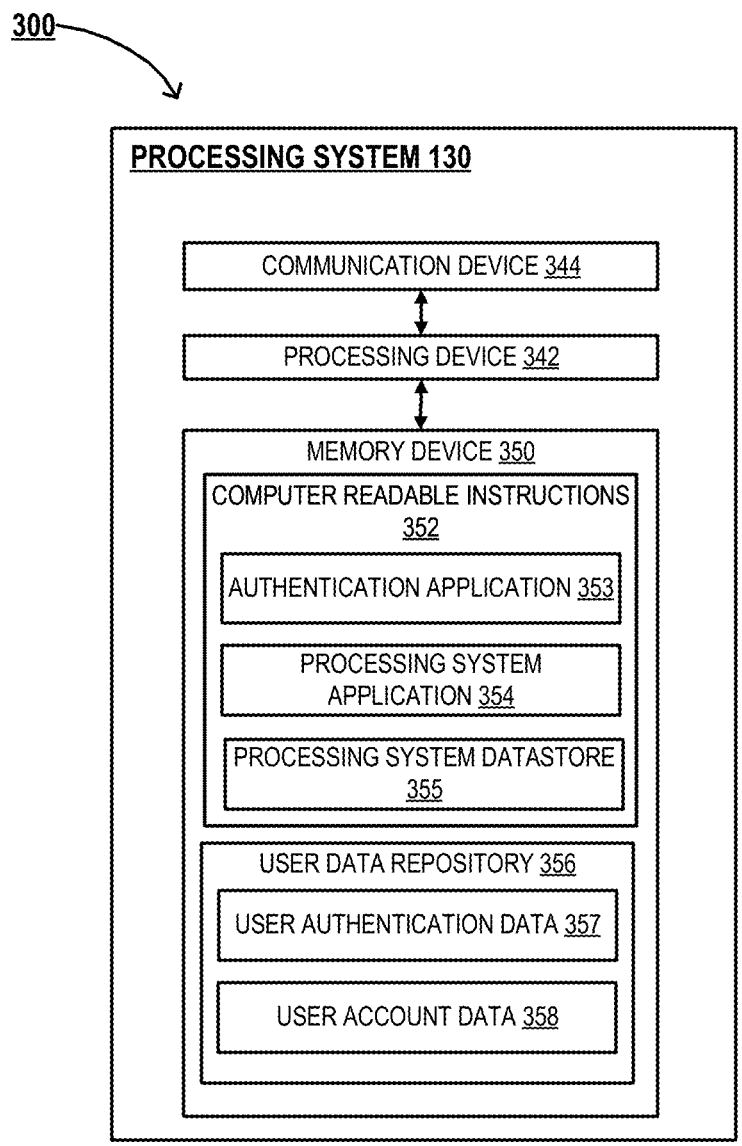
FIG. 3 illustrates a block diagram 300 of a processing system, in accordance with an embodiment of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 may be configured to control and cause the processor 210 of the portable item transfer container 120A to perform one or more functions. In some embodiments, the authentication application 353 and/or the processing system application 354 comprises computer readable instructions that when executed by the processing device 342 cause the processing device 342 to perform one or more functions and/or transmit control instructions to the portable item transfer container 120A, the authentication database 118, the third party system 116, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously.

The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like. Moreover, the processing system(s) 130 may be located at the geographic facility location of the container 120A (or within a predetermined geographic distance of the container 120A), and/or remotely with respect to the geographic facility location of the container 120A.

The communication device 344 may generally include a modem, server, transceiver, and/or other devices for communicating with other devices on the network 101. The network communication device 344 may be a communication interface having one or more communication devices configured to communicate with one or more other devices on the network 101, such as the portable item transfer container 120A and other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104, or the display device 280 of the portable item transfer container 120A. As another example, the user interface may be provided on the portable item transfer container 120A that may be controlled by the processing system 130 either directly or via the processor 210 of the portable item transfer container 120A.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity to interact with the portable item transfer container 120A, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
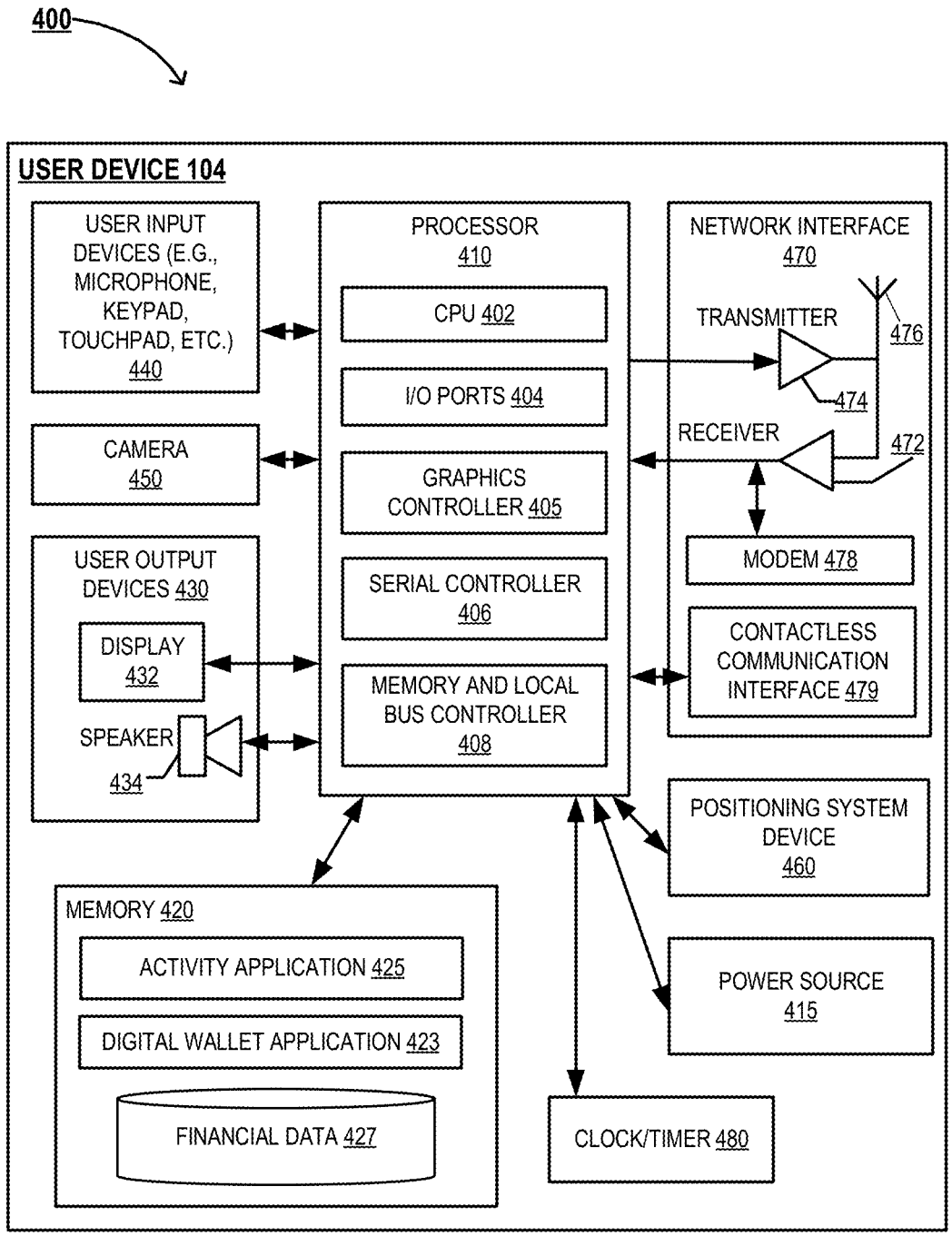
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, the computer system of the user container, or another device including, but not limited to portable digital assistants (PDAs), pagers, mobile televisions, gaming devices, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a digital wallet application 423, or a web browser application. The activity application 425 may then allow the mobile device 104 to transmit and receive data and instructions from the portable item transfer container 120A (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The digital wallet application 423 and the financial data module 427, together may include the necessary circuitry to provide token storage and transmission functionality, transmitter device signal encoding and decoding functionality to the mobile device 104, for secure transmission of financial and authentication credential tokens via the contactless communication interface 479 to the portable item transfer container 120A. Generally, the financial data module 427 may be a chip in the form of an integrated circuit, a microprocessor, a system-on-a-chip, a microcontroller, or the like. Of note, while FIG. 4 illustrates the financial data module 427 as an element within the mobile device 104, it will be apparent to those skilled in the art that the financial data module 427 functionality may be incorporated separately, within other elements in the mobile device 104, or may be included in a removable storage device such as an SD card or the like.

The processor 410 may be configured to use the network interface device 470 to communicate with one or more other devices on a network 101 such as, but not limited to the portable item transfer container 120A and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

Figure 5:
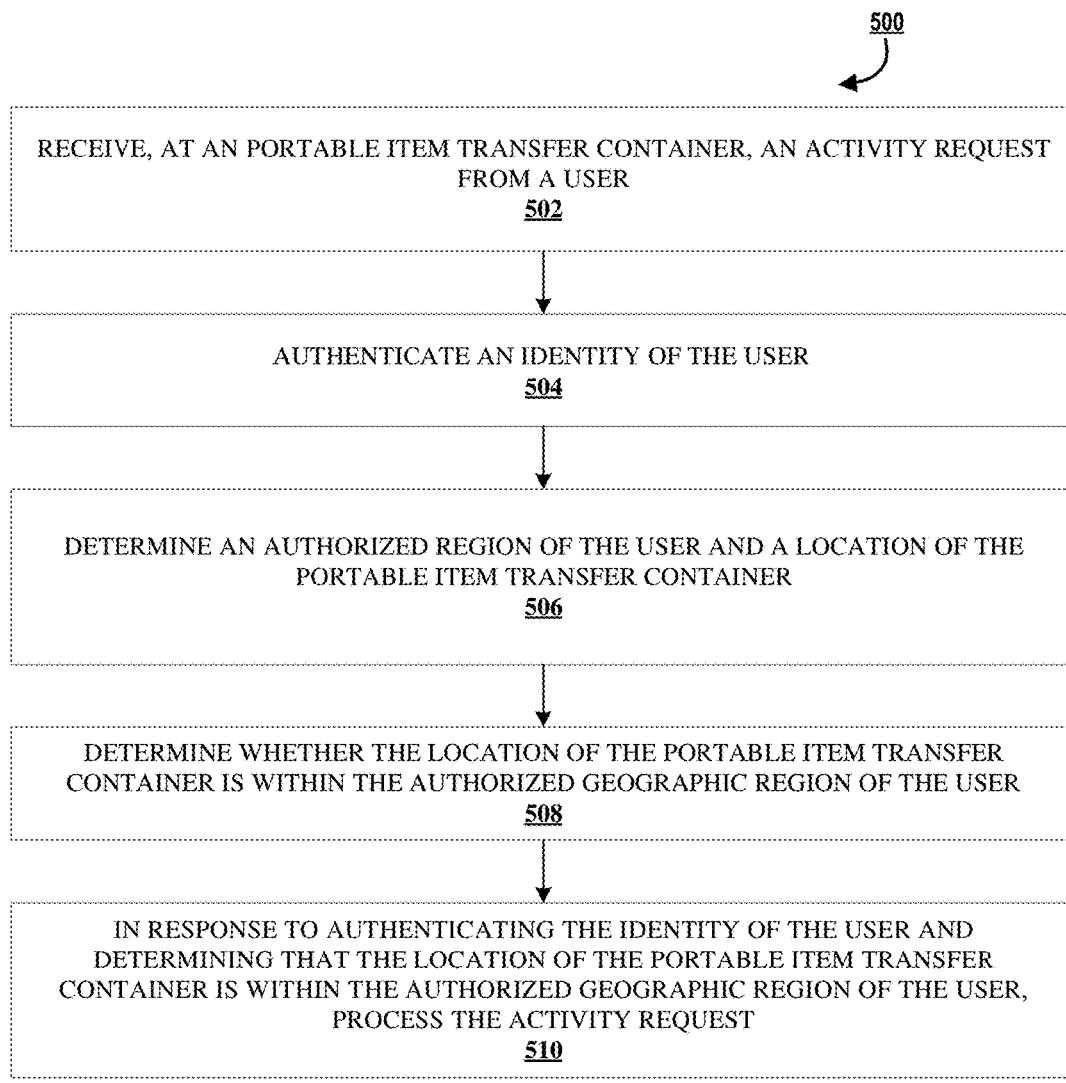
FIG. 5 illustrates a high level process flow 500 for providing the transfer of items via portable item transfer containers, in accordance with an embodiment of the invention.

FIG. 5 illustrates a high-level process flow 500 for providing the transfer of items via portable item transfer containers in accordance with one aspect of the present invention. Initially, at block 502, the portable item transfer container 120A receives an activity request from a user. The activity request may include a request to withdraw one or more items from the portable item transfer container 120A, a request to deposit one or more items in the portable item transfer container 120A, or a request that the perform otherwise engage in an interactive session with the user. In addition to depositing or withdrawing items, a user may check an account balance, print an account statement, transfer funds between accounts, or perform another activity/transaction during an interactive session with the portable item transfer container 120A. In some embodiments, the user may employ the user input devices 240 of the portable item transfer container 120A in order to initiate the activity request and otherwise interact with the portable item transfer container 120A. For example, the user may initiate an activity request by inserting or swiping a credit or debit card using a card reader of the portable item transfer container 120A. Alternatively, the user may employ the user device 104 to send the activity request to the portable item transfer container 120A and to otherwise interact with the portable item transfer container 120A.

At block 504, the portable item transfer container 120A authenticates the identity of the user. In this regard, the portable item transfer container 120A may receive authentication information (e.g., a username, password, personal identification number (PIN), biometric information, or the like) from the user. In one embodiment, the portable item transfer container 120A may then compare the received authentication information with stored information about the user in order to authenticate the identity of the user. In another embodiment, the portable item transfer container 120A may transmit the received authentication information to another system (e.g., the processing system 130 or the authentication database 118) that then responds back to the portable item transfer container 120A with an indication of whether the user's identity is authenticated. In an alternative embodiment, the user may directly send the authentication information to another system (e.g., the processing system 130 or the authentication database 118) that then responds back to the portable item transfer container 120A with an indication of whether the user's identity is authenticated.

At block 506, the portable item transfer container 120A determines an authorized region of the user and a location of the portable item transfer container 120A. Information regarding the location of the portable item transfer container 120A is typically received from the sensor devices 290 of the portable item transfer container 120A. For example, the location of the portable item transfer container 120A may be determined using GPS coordinates received from the positioning system 285. In some embodiments, the portable item transfer container 120A may request information related to the authorized geographic region of the user from the processing system 130 (e.g., after receiving the activity request). Alternatively, information regarding the authorized region of the user may already be stored in the memory device 230 (e.g., having been previously provided by the processing system 130).

The authorized region of the user is typically a geographic region in which the user is authorized to perform an activity using a portable item transfer container (e.g., the portable item transfer container 120A). For example, the authorized region of the user may correspond to the user's home or place of business, or a particular building or location within an entity/business facility associated with the user. The authorized region may be defined by an address, GPS coordinates, longitude and latitude, location name, location markers or identifiers (e.g., transmitter/beacon marker devices, visual markers such as signboards, symbols and other indicators, and the like), and/or any other information sufficient to identify the authorized region. In some embodiments, the authorized region may be defined by one or more geo-fences. A geo-fence is a virtual perimeter that defines the boundaries of an actual geographic area. In some embodiments, the authorized region of the user is defined by the entity that operates the processing system 130 and/or the portable item transfer container 120A. In other embodiments, the authorized region may be predefined by the user.

In addition to the above, in some instances, the authorized region of the user is typically a geographic region in which the portable item transfer container 120A is authorized to perform a particular activity. Typically, in some embodiments, the portable item transfer container is configured to modify the activities that a user can perform based on ascertaining the current location of the portable item transfer container (e.g., the portable item transfer container 120A). For example, the portable item transfer container may be configured to allow or perform a first user activity comprising withdrawal of a first type of items (e.g., items having a value above a predetermined threshold) by a first user only when the current location of the portable item transfer container is inside an office room associated with the first user within a business/entity facility, and/or only when the portable item transfer container ascertains (e.g., via the sensor devices and the image capture devices) that individuals other than the first user are not present in the vicinity or within a predetermined distance. As another example, the portable item transfer container may be configured to allow certain functionality such as deposits of items by a second user when the container is located in predetermined common areas of entity facility, while suspending other functionality such as withdrawal of items, audio commands/responses, and the like.

In addition to the above, in some instances, the portable item transfer container 120A is typically configured to determine a user type, user authorization level, user account type, user designation within the entity, current time, authorized user activities based on the authorization level, authorized item types for the user, and other user characteristics. Typically, in some embodiments, the portable item transfer container is configured to modify the activities that a user can perform based on ascertaining the current location of the portable item transfer container and based on the determined user characteristics. For example, the portable item transfer container 120A may further modify the activities that a user can perform at a particular location based on the user authorization level (e.g., prevent the user from performing certain activities until the user attains a requisite higher authorization level). That said, in some embodiments, if the user's account does not include use of the automated item transfer container 120A or if the user's account does not facilitate performance of one or more specific activities through the container 120A, the container 120A (e.g., via the input devices 240 and output devices 286 of the container 120A) may facilitate the user subscribing to a service (e.g., one-time or periodically) associated with the container 120A for using the container 120A to perform certain user activities via the user's account, provide additional authentication or user information for performing the one or more specific activities, and the like.

In addition to the above, in some instances, the portable item transfer container 120A is typically configured to modify the activities that a user can perform based on a current network connectivity of the container (e.g., connectivity of the communication channel between the container and the processing system 130) and/or based on determining that real-time operative communication with the processing system 130 cannot be established (e.g., temporary loss of connectivity, predicted loss of connectivity at a particular geographic location, and the like). Moreover, in some instances, the container 120A is configured to update user information (e.g., user account information or balances of a plurality of individuals associated with the entity location of the container 120A) stored locally in the memory (220, 230) of the container 120A with the most current information when the container is at a first location with the desired connectivity, (i) before moving to another second location with inferior connectivity, (ii) based on anticipating that another second location of the next user activity typically does not have the predetermined connectivity (e.g., by analyzing prior connectivity data of the container), (iii) based on identifying imminent changes to the communication channel or connectivity of the container 120A, and/or (iv) periodically.

Specifically, based on determining that the connectivity (e.g., bandwidth, speed, bit rate, and the like) of the communication channel between the container 120A and the processing system 130 is below a predetermined threshold or based on determining that operative communication between the container 120A and the processing system 130 has ceased, the container 120A may modify the activities that a user can perform. For example, a user may be authorized to withdraw a first amount A at a particular location L. However, based on determining that the container 120A is no longer in operative communication with the processing system 130 at the location L, (i) the container 120A may allow the user to withdraw a predetermined threshold limit amount T, lesser than the amount A, (ii) the container 120A may allow the user to withdraw the amount A based on identifying that the user previously deposited at least the amount A in the container, within a preceding predetermined time interval, and/or (iii) the container 120A may allow the user to withdraw the amount A based on identifying that the user account has a balance of at least the amount A (e.g., by analyzing the locally stored updated user information that was updated within a preceding predetermined time interval). That said, in some instances, based on determining that the connectivity (e.g., bandwidth, speed, bit rate, and the like) of the communication channel between the container 120A and the processing system 130 is below a predetermined threshold or based on determining that operative communication between the container 120A and the processing system 130 has ceased, the portable container 120A may identify another container 120B that has the requisite connectivity or operative communication with the processing system 130. The container 120A may then establish operative communication or a communication link with the processing system 130 via the container 120B.

At block 508, the portable item transfer container 120A compares the authorized region of the user with the location of the portable item transfer container 120A to determine whether the location of the portable item transfer container 120A is within the authorized region of the user. For example, the portable item transfer container 120A may determine whether GPS coordinates corresponding to the location of the portable item transfer container 120A are within a geo-fence corresponding to the authorized region of the user. By way of further example, the portable item transfer container 120A may determine whether GPS coordinates corresponding to the location of the portable item transfer container 120A are within a defined distance of GPS coordinates corresponding to an authorized location of the user. Alternatively, the processing system 130 may compare the authorized region of the user with the location of the portable item transfer container 120A, and then provide an indication to the portable item transfer container 120A of whether it is located in the authorized region of the user. As another example, the portable item transfer container 120A may determine that the location of the portable item transfer container is within the authorized region of the user based on receiving a proximity signal transmitted by a particular location marker device (e.g., a transmitter that is configured to transmit an encoded wireless proximity signal within a predetermined proximity area). Here, the container 120A may decode the signal to determine a unique location identifier of the location marker device, compare the unique location identifier with a plurality of unique location identifiers in a database/file/storage location comprising information regarding a corresponding plurality of location marker devices to determine the geographic location of the location marker device, and further ascertain that the location marker device having the unique location identifier is associated with the authorized geographic area of the user. As another example, the portable item transfer container 120A may determine that the location of the portable item transfer container is within the authorized region of the user based on identifying certain visual markers in a real-time video feed captured by a visual capture device of the container 120A (e.g., identifying a particular object or signpost within a predetermined distance, identifying a certain word or symbol on a plaque, and the like). In some instances, the suitable combination of the aforementioned methods may be used by the container 120A, for example, in conjunction with the processing system 130.

If the location of the portable item transfer container 120A is not within the authorized region of the user or the identity of the user is not authenticated, the portable item transfer container 120A may provide an error message to the user and then cease further processing of the activity request. Moreover, in some instances, the container may request the user to move the container to an authorized location for performing the activity. That said, if the identity of the user has been successfully authenticated and the location of the portable item transfer container 120A is within the authorized region of the user, then the portable item transfer container 120A processes the activity request (e.g., by performing the activity requested by the user).

Figure 6:
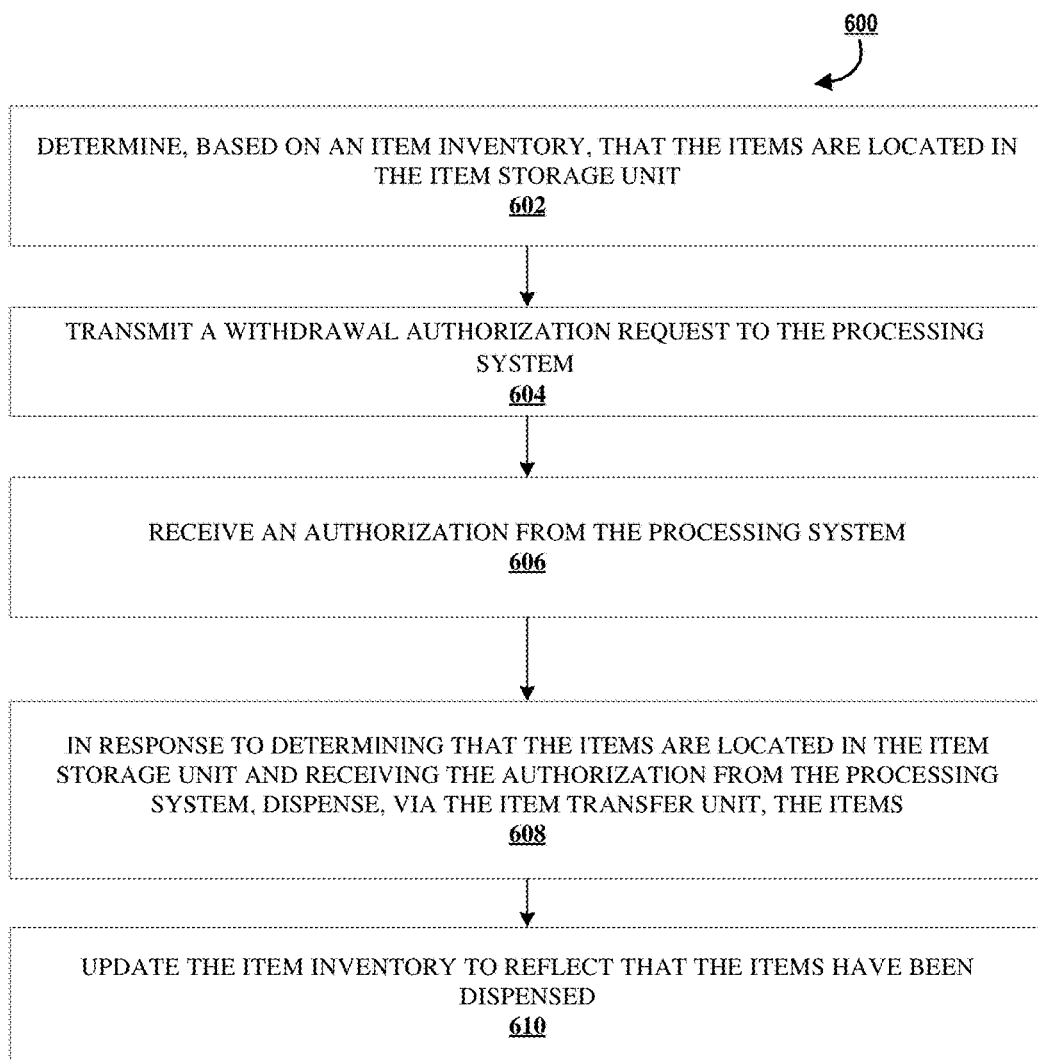
FIG. 6 illustrates a high level process flow 600 for processing an activity request, where the activity is withdrawing items, in accordance with an embodiment of the invention.

As noted, in some embodiments the activity requested by the user is withdrawing one or more items from the portable item transfer container 120A. In this regard, FIG. 6 depicts a high-level process flow 600 for processing an activity request, where the activity is withdrawing items, in accordance with one aspect of the present invention. Initially, if the identity of the user has been successfully authenticated and the location of the portable item transfer container 120A is within the authorized region of the user (as described above), then, at block 602, the portable item transfer container 120A typically determines that item(s) corresponding to the items the user wishes to withdraw are located in the item storage unit 264. As noted, the portable item transfer container 120A typically maintains an inventory of items located in the item storage unit 264. Accordingly, the portable item transfer container 120A will typically analyze this item inventory in order to determine whether the user's withdrawal request may be fulfilled with items currently located in the item storage unit 264. For example, if the user wishes to withdraw funds of a certain amount, the portable item transfer container 120A may determine that it has enough cash to fulfill the user's request, as well as sufficient quantities of cash denominations to precisely meet the user's request (e.g., if the user wishes to withdraw $40, but the portable item transfer container 120A only has $100 bills, then the portable item transfer container 120A would be unable to fulfill the user's request).

At block 604, the portable item transfer container 120A typically transmits (e.g., via the communication device 270) a withdrawal authorization request to the processing system 130. Once the processing system 130 receives the withdrawal authorization request from the portable item transfer container 120A, the processing system 130 typically determines whether the user is authorized to withdraw the items that the user has requested to withdraw. If the user is authorized to withdraw the items, then the processing system 130 will typically transmit an authorization to the portable item transfer container 120A. However, if the user is not authorized to withdraw the items, then the processing system 130 will typically notify the portable item transfer container 120A that the user is not authorized to withdraw the items. For example, if the user has requested to withdraw cash from the portable item transfer container 120A, the processing system 130 will typically determine whether an account of the user (e.g., a checking account) has enough funds to meet the request. If the user has enough funds, the processing system 130 may then transmit an authorization to the portable item transfer container 120A. In addition, the processing system 130 may decrease a balance of an account of the user by the amount to be withdrawn by the user. That said, if the user does not have enough funds, then the processing system 130 may notify the portable item transfer container 120A that the user is not authorized to withdraw the requested cash.

At block 606, the portable item transfer container 120A receives the authorization from the processing system 130. In response to determining that the requested items are located in the item storage unit 264 and receiving the authorization from the processing system 130, at block 608, the portable item transfer container 120A dispenses the requested items via the item transfer unit 262 (e.g., cash requested by the user may be dispensed via a cash dispenser). However, if the requested items are not stored by the portable item transfer container 120A, or the portable item transfer container 120A does not receive the authorization from the processing system 130, then the portable item transfer container 120A may notify the user that the items cannot be withdrawn (e.g., by displaying a corresponding message on the display device 280 of the portable item transfer container 120A or transmitting a message to the user device 104).

In some embodiments, the automated item transfer container 120A further comprises one or more secure dispensing containers located within the secure physical housing 260 of the container 120A, wherein the dispensing containers are configured to hold one or more items. Typically, the items are stored in the secure dispensing container such that the items may be retrieved from the secure dispensing container only after validation or authentication credentials received from a recipient user, or after unlocking the dispensing container using a predetermined physical key, and/or electronic key or token. In such embodiments, dispensing the requested items via the item transfer unit 262 comprises placing the items to be dispensed (e.g., cash requested by the user) in a secure dispensing container of the container 120A, locking or securing the dispensing container, and dispensing the locked dispensing container containing the items to a user, another recipient or a dispensing location (e.g., via an output portal of the housing 260). After retrieving the dispensed secure dispensing container having the items, the user or recipient may unlock the secure dispensing container after providing requisite authentication credentials to withdraw items contained therein.

Finally, at block 610, the portable item transfer container 120A updates the item inventory to reflect that the items requested by the user have been withdrawn. For example, if the item inventory previously showed that the item storage unit contained ten $100 bills and user subsequently withdraws two $100 bills, then the portable item transfer container 120A would update the item inventory to indicate that the item storage unit now contains eight $100 bills.

Figure 7:
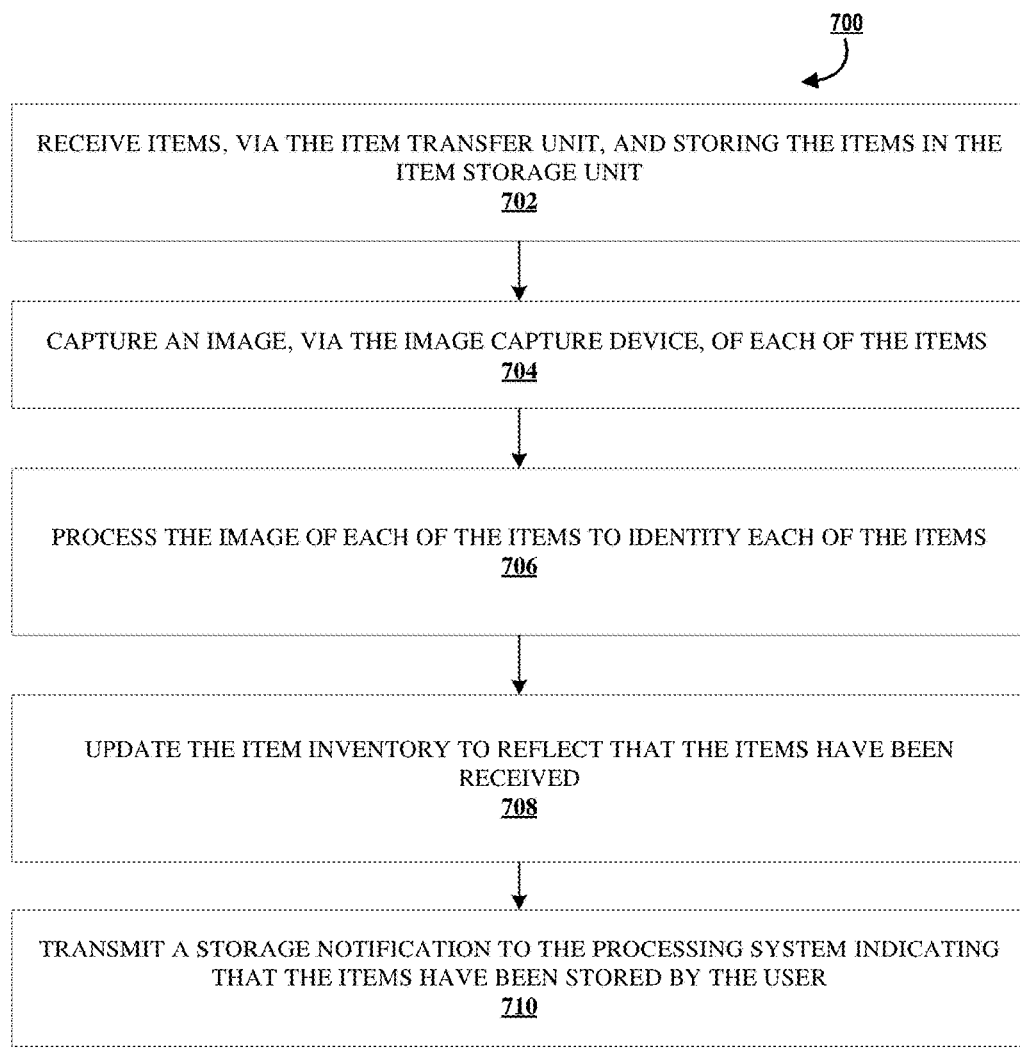
FIG. 7 illustrates a high level process flow 700 for processing an activity request, where the activity is storing items, in accordance with an embodiment of the invention.

In other embodiments the activity requested by the user is depositing (e.g., storing) one or more items from the portable item transfer container 120A. In this regard, FIG. 7 depicts a high-level process flow 700 for processing an activity request, where the activity is storing items, in accordance with one aspect of the present invention. At block 702, the portable item transfer container 120A receives the item(s) (e.g., via the item transfer unit 262). For example, the user may insert cash or checks that the user wishes to deposit into a deposit mechanism of the item transfer unit 262. Once received, the items are stored in the item storage unit 264.

At block 704, one or more images are captured (e.g., by the image capture device 250) of each of the items that the user is depositing. For example, if the user is depositing cash or checks, the image capture device 250 may take a picture of the front and back of each check or bill. The images are typically captured either as the items are inserted into the item transfer unit 262 or as the items are internally transferred to the item storage unit 264.

At block 706, the image(s) of each of the deposited items is processed (e.g., by the portable item transfer container 120A) in order to identify each of the items being deposited. For example, the portable item transfer container 120A may identify whether a deposited item is cash or a check, as well as the value of the deposited item.

Various types of processing techniques may be employed to identify the exact items deposited. In many instances the items deposited may include cash and/or checks. Accordingly, optical character recognition (OCR) processes may be applied to at least a portion of the images. The OCR processes enables the portable item transfer container 120A to convert handwritten or printed text and other symbols in the check images to other formats such as text files and/or metadata, which can then be used to identify the value of the check deposited (as well as other information contained on the check) or the denomination of an inserted bill. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters. In some embodiments, other processing techniques such as intelligent word recognition (IWR) and intelligent character recognition (ICR) may be used to recognize and extract handwritten text. In some embodiments, the OCR process includes location fields for determining the position of data on an image. Based on the position of the data, the portable item transfer container 120A can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the portable item transfer container 120A for determining approximate location. In other embodiments, the portable item transfer container 120A defines the location fields by separating the portions and/or elements of an image into quadrants. As referred to herein, the term quadrant is used broadly to describe the process of differentiating elements of an image by separating portions and/or elements of the image of the image into sectors in order to define the location fields. These sectors may be identified using a two-dimensional coordinate system or any other system that can be used for determining the location of the sectors. In many instances, each sector will be rectangular in shape. In some embodiments, the portable item transfer container 120A identifies each portion of the image using a plurality of quadrants. In such an embodiment, the portable item transfer container 120A may further analyze each quadrant using the OCR algorithms in order to determine whether each quadrant has valuable or useful information. Generally, valuable or useful information may relate to any data or information that may be used for processing of the deposited item, used for identifying the item, and the like. Once the portable item transfer container 120A determines the quadrants of the image having valuable and/or useful information, the portable item transfer container 120A can extract the identified quadrants together with the information from the image for analysis (and optionally, storage). The quadrants may be extracted as metadata, text, or code representing the contents of the quadrant. In some embodiments, the quadrants of the image that are not identified as having valuable and/or useful information are not extracted from the image.

In additional embodiments, the portable item transfer container 120A uses a grid system to identify non-data and data elements of an image. The grid system may be similar to the quadrant system. Using the grid system, the portable item transfer container 120A identifies the position of each grid element using a coordinate system (e.g., x and y coordinates or x, y, and z coordinate system or the like) or similar system for identifying the spatial location of a grid element on an image. In practice, the spatial location of a grid element may be appended to or some manner related to grid elements with image data. For example, using the grid, the portable item transfer container 120A may identify which grid elements of the grid contain data elements, such as bill amount, check amount, or payee name, and either at the time of image capture or extraction of the check image within the grid, the system can tag the grid element having the data element with the grid element's spatial location. In alternative or additional embodiments, the OCR process includes predefined fields to identify data. The predefined field includes one or more characters, words, or phrases that indicate a type of data. In such embodiments, the system of process 100 extracts all the data presented in the image regardless of the location of the data and uses the predefined fields to aid in character recognition. In addition to OCR processes, the system of process 100 can use other techniques such as image overlay to locate, identify, and extract data from the images. In some embodiments, the portable item transfer container 120A uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the portable item transfer container 120A will know to capture any data elements to the right or to the left of the identified locations or include the identified data element in the capture. The portable item transfer container 120A may choose to capture the data elements of a check in any manner using the information determined from the MICR number of the check.

Although the images of the deposited items are typically processed by the portable item transfer container 120A in order to identify the items, in alternative embodiment, the portable item transfer container 120A may transmit captured images to the processing system 130 so that the processing system 130 can identify the item(s) and notify the portable item transfer container 120A of the identity of the items. In some embodiments, processing the image of the deposited item comprises verifying the authenticity of the item by the portable item transfer container 120A. In the instances where the authenticity of the item cannot be established, the portable item transfer container 120A may return the item back to the user.

Based on identify each deposited/received item, at block 708, the portable item transfer container 120A updates the item inventory to reflect that the items have been deposited/received. For example, if the user deposits three $100 bills, the system may update the item inventory by increasing the quantity of stored $100 bills by three. In some embodiments, the portable item transfer container 120A may further transmit, in real time, the scanned image of the deposited item to the processing system 130 for maintaining a centralized record of the item.

At block 710, the portable item transfer container 120A transmits (e.g., via the communication interface 270) a storage notification to the processing system 130 indicating that the items have been deposited/stored by the user. In addition, to notifying the processing system 130 indicating that the items have been deposited by the user, the portable item transfer container 120A provide any other data to the processing system 130 that the processing system 130 uses to further process the deposit by the user. For example, the portable item transfer container 120A may provide the processing system 130 with the value (either of individual items or the aggregate value of all items) of the deposited items, the identity of the deposited items, images of the deposited items, data extracted from the images (e.g., bill denomination, check amount, or check payor information, such as the name of the payor and the payor's account information), an account identified by the user to which the user would like the deposit credited, and/or the like. For example, if the user deposits cash and one or more checks in the portable item transfer container 120A, the processing system 130 may then increase an account balance of an account of the user by the aggregate amount of the deposited cash and checks.

In addition to the foregoing, in some embodiments, based on determining that the automated item transfer container 120A is unable to perform one or more predetermined user activities (e.g., identifying based on the item inventory that the item storage unit and the receptacles of the container 120A are filled to capacity or identifying that the container 120A), the automated item transfer container 120A may transmit a signal to another automated item transfer container 120B in the vicinity. Subsequently, based on receiving the signal, in certain instances (e.g., when a container 120A with maximum utilization of storage capacity may need to be docked in a central deposit location to deposit the items), the automated item transfer container 120B may continue the performance of the predetermined user activities of the container 120A, for example, by performing one or more scheduled activities. Moreover, in some instances, based on receiving the signal, the automated item transfer container 120B may be configured to retrieve/receive one or more items from the container 120A (e.g., the container 120A with maximum storage utilization), before commencing the predetermined activities of the container 120A.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/462,036 (now published as U.S. Patent Application Pub. No. 2018/0267904) | AUTOMATED ITEM TRANSFER VEHICLE | Concurrently herewith |

The invention claimed is:

1. A portable item transfer container, comprising:
an item storage unit;
an item transfer unit configured to (i) dispense one or more first items stored in the item storage unit and (ii) receive one or more second items and store the one or more second items in the item storage unit, wherein the item transfer unit comprises:
  an input mechanism for receiving the one or more second items via an input portal and storing the one or more second items in an input receptacle and the item storage unit;
  a transfer mechanism for moving the one or more second items stored in the input receptacle to an output receptacle; and
  an output mechanism for dispensing the one or more first items via an output portal;
a secure physical housing enclosing an internal cavity, wherein the item transfer unit and the item storage unit are located in the internal cavity within the secure physical housing;
the input portal, the input portal being located in the secure physical housing configured for receiving the one or more second items from a user;
the output portal, the output portal being located in the secure physical housing configured for dispensing the one or more first items from the portable item transfer container;
the input receptacle, the input receptacle being located proximate the input portal configured for storing the one or more second items; and
the output receptacle, the output receptacle being located proximate the output portal configured for temporarily storing the one or more first items;
an image capture device;
a communication device;
a memory;
a processor;
an item inventory stored in the memory; and
an item transfer application stored in the memory, executable by the processor, and configured for:
  receiving an activity request from the user, wherein the activity request comprises (i) a request to withdraw the one or more first items or (ii) a request to store the one or more second items;
  authenticating an identity of the user;
  determining (i) an authorized region of the user and (ii) a location of the portable item transfer container;
  comparing the authorized region of the user and the location of the portable item transfer container and determining that the location of the portable item transfer container is within the authorized region of the user; and
  in response to authenticating the identity of the user and determining that the location of the portable item transfer container is within the authorized region of the user, processing the activity request;

wherein, if the activity request comprises the request to withdraw the one or more first items, processing the activity request comprises:

determining, based on the item inventory, that the one or more first items are located in the item storage unit;

transmitting, via the communication device, a withdrawal authorization request to a processing system;

receiving, via the communication device, an authorization from the processing system;

in response to determining that the one or more first items are located in the item storage unit and receiving the authorization from the processing system, dispensing, via the item transfer unit, the one or more first items; and updating the item inventory to reflect that the one or more first items have been dispensed;

wherein, if the activity request comprises the request to store the one or more second items, processing the activity request comprises:

receiving the one or more second items, via the item transfer unit, and storing the one or more second items in the item storage unit;

capturing an image, via the image capture device, of each of the one or more second items;

processing the image of each of the one or more second items to identify each of the one or more second items;

updating the item inventory to reflect that the one or more second items have been received; and transmitting, via the communication device, a storage notification to the processing system indicating that the one or more second items have been stored by the user.

2. The portable item transfer container according to claim 1, comprising a geo-positioning device, wherein the item transfer application is configured for determining the location of the portable item transfer container via the geo-positioning device.

3. The portable item transfer container according to claim 1, comprising a user interface, wherein the item transfer application is configured for receiving, via the user interface, the activity request from the user.

4. The portable item transfer container according to claim 1, wherein the item transfer application is configured for receiving, via the communication device, the activity request from a mobile device of the user.

5. The portable item transfer container according to claim 1, wherein the activity request comprises the request to withdraw the one or more first items.

6. An item transfer system, comprising:
the portable item transfer container according to claim 5; and
the processing system, wherein the processing system is configured for:
receiving the withdrawal authorization request from the portable item transfer container;
determining that the user is authorized to withdraw the one or more first items; and
in response to determining that the user is authorized to withdraw the one or more first items, transmitting the authorization to the portable item transfer container.

7. The item transfer system according to claim 6, wherein:
the request to withdraw the one or more first items comprises a request to withdraw cash of a withdrawal amount;
determining that the user is authorized to withdraw the one or more first items comprises determining that an account balance of the user is greater than the withdrawal amount; and
the processing system is configured for reducing the account balance by the withdrawal amount.

8. The portable item transfer container according to claim 1, wherein the activity request comprises the request to store the one or more second items.

9. An item transfer system, comprising:
the portable item transfer container according to claim 8; and
the processing system, wherein the processing system is configured for receiving the storage notification from the portable item transfer container.

10. The item transfer system according to claim 9, wherein:
the one or more first items comprises cash or one or more checks;
processing the activity request comprises determining an aggregate amount of the one or more first items and notifying the processing system of the aggregate amount; and
the processing system is configured for increasing an account balance of the user by the aggregate amount.

11. The portable item transfer container according to claim 1, wherein the item transfer application is configured for:
receiving the one or more second items, via the input portal;
storing, via the input mechanism, the one or more second items in the input receptacle;
capturing an image, via the image capture device, of each of the one or more second items;
processing the image of each of the one or more second items to identify an item type for each of the one or more second items;
based on identifying an item type for each second item of the one or more second items in the input receptacle, (i) storing the second item, via the input mechanism, in the item storage unit based on identifying that the second item is of a predetermined item type, or (ii) transferring, via the transfer mechanism, the second item to the output receptacle, based on identifying that the second item is not associated with the predetermined item type; and
based on determining that (i) the input receptacle does not contain any of the one or more second items and that (ii) the output receptacle has at least one second item of the one or more second items, transferring, using the transfer mechanism, the at least one second item that is not associated with the predetermined item type from the output receptacle for storage in the input receptacle.

12. The portable item transfer container according to claim 1, wherein the item transfer application is configured for:
receiving the activity request from the user to withdraw the one or more first items;
in response to determining that the one or more first items are located in the input receptacle, determining a minimum number of first items to be moved for dispensing the one or more first items;

transferring, via the transfer mechanism, the minimum number of first items from the input receptacle to the output receptacle; and for each first item of the minimum number of first items in the output receptacle, (i) dispensing, via the output mechanism, the first item through the output portal, based on identifying that the first item matches the user request, or (ii) transferring, via the transfer mechanism, the first item to the input receptacle for storage, based on identifying that first item does not match the user request.

13. A method of transferring physical items via a portable item transfer container, comprising:

providing the portable item transfer container, the portable item transfer container comprising:

an item storage unit;

an item transfer unit configured to (i) dispense one or more first items stored in the item storage unit and (ii) receive one or more second items and store the one or more second items in the item storage unit, wherein the item transfer unit comprises:

an input mechanism for receiving the one or more second items via an input portal and storing the one or more second items in an input receptacle and the item storage unit;

a transfer mechanism for moving the one or more second items stored in the input receptacle to an output receptacle; and an output mechanism for dispensing the one or more first items via an output portal;

a secure physical housing enclosing an internal cavity, wherein the item transfer unit and the item storage unit are located in the internal cavity within the secure physical housing;

the input portal, the input portal being located in the secure physical housing configured for receiving the one or more second items from a user;

the output portal, the output portal being located in the secure physical housing configured for dispensing the one or more first items from the portable item transfer container;

the input receptacle, the input receptacle being located proximate the input portal configured for storing the one or more second items; and the output receptacle, the output receptacle being located proximate the output portal configured for temporarily storing the one or more first items;

an image capture device;

a communication device;

a memory;

a processor;

an item inventory stored in the memory; and an item transfer application stored in the memory and executable by the processor;

receiving an activity request, via the item transfer application, from the user, wherein the activity request comprises (i) a request to withdraw the one or more first items or (ii) a request to store the one or more second items;

authenticating, via the item transfer application, an identity of the user;

determining, via the item transfer application, (i) an authorized region of the user and (ii) a location of the portable item transfer container;

comparing, via the item transfer application, the authorized region of the user and the location of the portable item transfer container and determining that the location of the portable item transfer container is within the authorized region of the user;

in response to authenticating the identity of the user and determining that the location of the portable item transfer container is within the authorized region of the user, processing, via the item transfer application, the activity request;

wherein, if the activity request comprises the request to withdraw the one or more first items, processing the activity request comprises:

determining, based on the item inventory, that the one or more first items are located in the item storage unit;

transmitting, via the communication device, a withdrawal authorization request to a processing system;

receiving, via the communication device, an authorization from the processing system;

in response to determining that the one or more first items are located in the item storage unit and receiving the authorization from the processing system, dispensing, via the item transfer unit, the one or more first items; and updating the item inventory to reflect that the one or more first items have been dispensed;

wherein, if the activity request comprises the request to store the one or more second items, processing the activity request comprises:

receiving the one or more second items, via the item transfer unit, and storing the one or more second items in the item storage unit;

capturing an image, via the image capture device, of each of the one or more second items;

processing the image of each of the one or more second items to identify each of the one or more second items;

updating the item inventory to reflect that the one or more second items have been received; and transmitting, via the communication device, a storage notification to the processing system indicating that the one or more second items have been stored by the user.

14. The method according to claim 13, wherein the activity request comprises the request to withdraw the one or more first items.

15. The method according to claim 14, comprising receiving, via the processing system, the withdrawal authorization request from the portable item transfer container;

determining, via the processing system, that the user is authorized to withdraw the one or more first items;

in response to determining that the user is authorized to withdraw the one or more first items, transmitting, via the processing system, the authorization to the portable item transfer container.

16. The method according to claim 15, wherein:

the request to withdraw the one or more first items comprises a request to withdraw cash of a withdrawal amount;

determining that the user is authorized to withdraw the one or more first items comprises determining that an account balance of the user is greater than the withdrawal amount; and the method comprises reducing, via the processing system, the account balance by the withdrawal amount.

17. The method according to claim 13, wherein the activity request comprises the request to store the one or more second items.

18. The method according to claim 17, comprising:
receiving, via the processing system, the storage notification from the portable item transfer container.

19. The method according to claim 18, wherein:
the one or more first items comprises cash or one or more checks;

processing the activity request comprises determining an aggregate amount of the one or more first items and notifying the processing system of the aggregate amount;

the method comprises increasing, via the processing system, an account balance of the user by the aggregate amount.

\* \* \* \* \*